(12) United States Patent
Ko et al.

(10) Patent No.: US 10,418,147 B2
(45) Date of Patent: *Sep. 17, 2019

(54) CONDUCTIVE COATING LIQUID COMPOSITION, AND AN ANTISTATIC FILM AND A DISPLAY DEVICE USING THE SAME

(71) Applicants: LG DISPLAY CO., LTD., Seoul (KR); NANO SOLUTION CO., LTD., Jeonju-si, Jeollabuk-do (KR)

(72) Inventors: Sungwook Ko, Seoul (KR); Junsik Hwang, Seoul (KR); Kwihong Park, Paju-si (KR); Hyungyul Kim, Seongnam-si (KR); Hojun Moon, Jeonju-si (KR)

(73) Assignees: LG DISPLAY CO., LTD., Seoul (KR); NANO SOLUTION CO., LTD., Jeongju-si (KR)

( * ) Notice: Subject to any disclaimer, the term of this patent is extended or adjusted under 35 U.S.C. 154(b) by 50 days.

This patent is subject to a terminal disclaimer.

(21) Appl. No.: 15/394,187

(22) Filed: Dec. 29, 2016

(65) Prior Publication Data

US 2017/0190922 A1  Jul. 6, 2017

(30) Foreign Application Priority Data

Dec. 31, 2015  (KR) .................. 10-2015-0191574

(51) Int. Cl.
*H01B 1/24* (2006.01)
*C09D 5/24* (2006.01)
(Continued)

(52) U.S. Cl.
CPC ............... *H01B 1/24* (2013.01); *C08K 3/041* (2017.05); *C08K 5/05* (2013.01); *C08K 5/54* (2013.01); *C09D 5/24* (2013.01); *C09D 7/20* (2018.01); *C09D 7/40* (2018.01); *C09D 7/61* (2018.01); *C09D 7/63* (2018.01); *C09D 133/02* (2013.01); *G02F 1/13338* (2013.01); *G02F 1/133528* (2013.01); *G06F 3/044* (2013.01); *G06F 3/0412* (2013.01); *G06F 3/0416* (2013.01);
(Continued)

(58) Field of Classification Search
None
See application file for complete search history.

(56) References Cited

FOREIGN PATENT DOCUMENTS

| CN | 102153367 A | 8/2011 |
|---|---|---|
| CN | 102544343 A | 7/2012 |

(Continued)

OTHER PUBLICATIONS

English text machine translation of Han et al. (KR 2009-0032604 A), accessed from the EPO website, copy attached as a PDF, pp. 1-8. (Year: 2009).*

(Continued)

*Primary Examiner* — Katie L. Hammer
(74) *Attorney, Agent, or Firm* — Dentons US LLP

(57) ABSTRACT

Provided is a display device having an antistatic film made of a conductive coating liquid composition. The conductive coating liquid composition includes 10 to 100 parts by weight of a silane sol based on 100 parts by weight of a carbon nanotube dispersion liquid composition, and 0.1 to 5 wt % of a polar solvent based on 100 wt % of the conductive coating liquid composition.

6 Claims, 13 Drawing Sheets

(51) Int. Cl.

| | | |
|---|---|---|
| *C09D 133/02* | (2006.01) | |
| *C09D 7/00* | (2018.01) | |
| *G02F 1/1333* | (2006.01) | |
| *G02F 1/1335* | (2006.01) | |
| *G06F 3/041* | (2006.01) | |
| *H01B 1/04* | (2006.01) | |
| *G06F 3/044* | (2006.01) | |
| *C08K 3/04* | (2006.01) | |
| *C09D 7/20* | (2018.01) | |
| *C09D 7/40* | (2018.01) | |
| *C09D 7/61* | (2018.01) | |
| *C09D 7/63* | (2018.01) | |
| *C08K 5/05* | (2006.01) | |
| *C08K 5/54* | (2006.01) | |

(52) U.S. Cl.
CPC ............ *G06F 3/0418* (2013.01); *H01B 1/04* (2013.01); *C08K 3/04* (2013.01); *C08K 2201/001* (2013.01); *G02F 2201/50* (2013.01); *G02F 2201/503* (2013.01); *G02F 2202/22* (2013.01); *G02F 2202/36* (2013.01); *G06F 2203/04103* (2013.01); *G06F 2203/04107* (2013.01)

(56) References Cited

FOREIGN PATENT DOCUMENTS

| | | |
|---|---|---|
| CN | 104118179 A | 10/2014 |
| KR | 20090032604 A * | 4/2009 |
| KR | 20130082300 A * | 7/2013 |
| KR | 20130082300 A | 7/2013 |
| KR | 10-20130104754 A | 9/2013 |
| KR | 101311876 B1 | 9/2013 |

OTHER PUBLICATIONS

English text machine translation of Kim et al. (KR 2013-0082300 A), accessed from the EPO website, copy attached as a PDF, pp. 1-8. (Year: 2013).*

* cited by examiner

FIG. 1 - RELATED ART
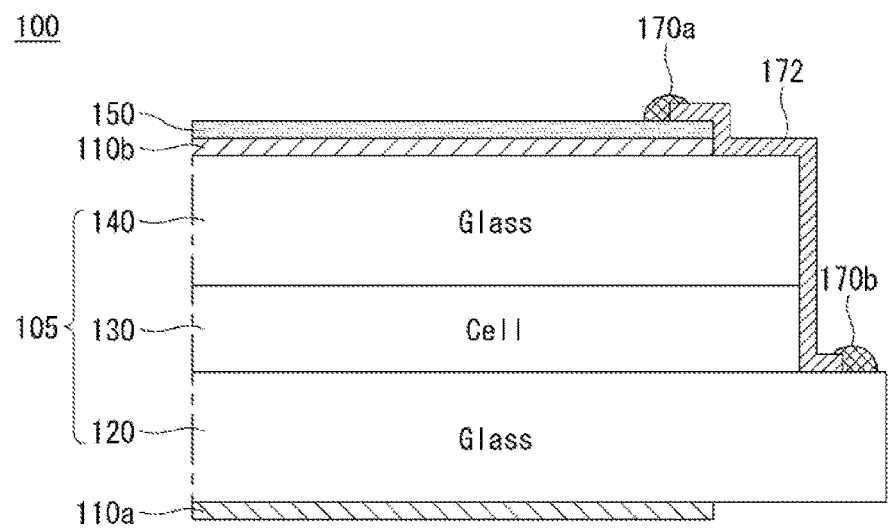
FIG. 2
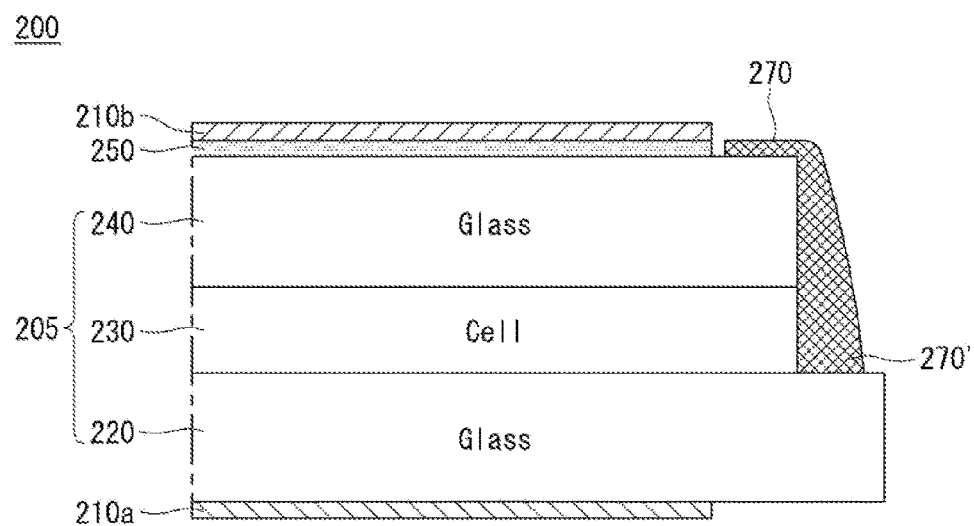

CONDUCTIVE COATING LIQUID COMPOSITION, AND AN ANTISTATIC FILM AND A DISPLAY DEVICE USING THE SAME

CROSS-REFERENCE TO RELATED APPLICATION

This application claims priority from Korean Patent Application No. 10-2015-0191574 filed on Dec. 31, 2015, which is incorporated herein by reference for all purposes as if fully set forth herein.

BACKGROUND OF THE INVENTION

Technical Field

The present disclosure relates to a conductive coating liquid composition, and an antistatic film and a display device using the same.

Discussion of Related Art

With the current rapid development of the information-oriented society, there is a growing need of flat panel displays having excellent characteristics, such as slim profile, light weight, and low power consumption. Of these, liquid crystal displays have been widely applied to laptops or desktop monitors due to their excellent resolution, color display, and picture quality.

In general, a liquid crystal display is a device in which two substrates each having electrodes on one surface thereof are disposed such that the electrode-formed surfaces face each other, a liquid crystal material is interposed between the two substrates, and then a voltage is applied to the electrodes formed on the respective substrates to generate an electric field, which moves liquid crystal molecules to vary the transmittance of light, thereby displaying images. Here, much static electricity may be generated during the unit processes of manufacturing each substrate of the liquid crystal display.

In order to discharge such static electricity and effectively release charges accumulated at the time of producing finished products, indium-tin-oxide (ITO) or indium zinc oxide (IZO), which is a transparent conductive material, is utilized for an antistatic film on an external surface of the upper substrate. However, indium tin oxide (ITO) and indium zinc oxide (IZO) are very expensive transparent conductive metal materials, which thus increase the manufacturing costs. Especially, the price of indium, a rare metal, which is the main raw material of indium tin oxide (TIO) and indium zinc oxide (IZO), has increased rapidly in recent years, and its supply is currently restricted due to the export control policy of the resource holding countries.

The recent introduction of portable products with embedded touch sensors, such as mobile phones, PDAs, laptops, etc., which can be operated by touching the screen, are attracting a lot of attention from users. In line with this trend, many attempts have been made in recent years to add touch functionality to liquid crystal displays that are used as display devices in a variety of applications. Of these, the demand for in-cell liquid crystal displays with embedded touch functionality is on the rise. In-cell liquid crystal displays have advantages, such as slim profile, improved cost structure owing to the reduction in the cost of raw materials, and lightweight, since touch electrodes are formed inside the display panel, without a separate touch panel attached on the liquid crystal display.

However, in spite of the touch sensors provided inside the display panel with in-cell technology, static electricity is discharged by the aforementioned antistatic film, and thus the touch sensors are not able to detect a change in capacitance when touched by a finger or the like, thereby resulting in deterioration in the touch sensitivity of the touch sensors. In other words, the antistatic film serves as a conductor with relatively high electrical conductivity when compared with an amount of capacitance generated by a finger touch or the like, thereby discharging the capacitance so that the touch sensors are not able to recognize touch from a user's finger or the like.

Eliminating the antistatic film to address this problem will lead to a higher failure rate due to static electricity generated during manufacturing, which, in turn, increases the cost of failure and again increases the manufacturing costs, thus degrading low display quality.

SUMMARY

An aspect of the present invention is to provide a conductive coating liquid composition which can improve the dispersion of carbon nanotubes.

Another aspect of the present invention is to provide a display device having an antistatic film made of the above conductive coating liquid composition.

Yet another aspect of the present invention is to provide an antistatic film and a display device which can avoid failures caused by static electricity, prevent degradation in touch sensitivity, improve surface resistance uniformity, thermal resistance, and reliability, and reduce manufacturing costs by easily discharging static electricity generated during the manufacturing process.

One exemplary embodiment of the present disclosure is directed to conductive coating liquid composition comprising 10 to 100 parts by weight of a silane sol and 0.1 to 5 wt % of a polar solvent based on 100 wt % of the conductive coating liquid composition.

In another exemplary embodiment, the polar solvent has a polarity of 10 or higher.

In another exemplary embodiment, the polar solvent comprises at least one selected from n-methyl pyrolidone (NMP), dimethyl sulphoxide (DMSO), and dimethyl formamide (DMF).

In another exemplary embodiment, the carbon nanotube dispersion liquid composition further comprises 0.05 to 20 wt % of carbon nanotubes, 0.02 to 40 wt % of a polyacrylic acid resin, and 50 to 99.93 wt % of a straight-chain alkanol having 2 to 5 carbon atoms based on 100 wt % of the conductive coating liquid composition.

In another exemplary embodiment, the silane sol comprises an alkoxysilane compound, an acid catalyst, an alcohol-based solvent, and water.

In another exemplary embodiment, the silane sol comprises 20 to 60 wt % of the alkoxysilane compound, 10 to 70 wt % of the alcohol-based solvent, and 5 to 60 wt % of water based on the total weight of the silane sol.

Another exemplary embodiment of present disclosure is directed to a display device comprising an antistatic film comprising the conductive coating liquid composition described herein.

Another exemplary embodiment of the present disclosure is directed to a display device comprising: a display panel on a lower polarizer; an upper polarizer on the display panel; and an antistatic film between an upper substrate of the display panel and the upper polarizer, wherein the antistatic film comprises carbon nanotubes and a silane sol, and wherein the antistatic film has a sheet resistance of $10^4$ Ω/sq to $10^9$ Ω/sq.

In another exemplary embodiment, the display panel further comprises touch electrodes.

In other exemplary embodiment, the touch electrodes are positioned in an upper or lower part of the display panel.

In another exemplary embodiment, the carbon nanotubes have a sheet resistance of 1,000 Ω/sq to 20,000 Ω/sq.

Another exemplary embodiment of the present disclosure provides an antistatic film comprising carbon nanotubes and a silane sol, wherein the antistatic film has a sheet resistance of $10^4$ Ω/sq to $10^9$ Ω/sq.

BRIEF DESCRIPTION OF THE DRAWINGS

The accompanying drawings, which are included to provide a further understanding of the invention and are incorporated in, and constitute a part of, the present disclose, illustrate various exemplary embodiments of the present disclosure and, together with the description herein, serve to explain the principles of the invention. In the drawings:

FIG. 1 is a cross-sectional view of a related art display device;

FIG. 2 is a cross-sectional view of a display device according to an exemplary embodiment of the present disclosure;

DETAILED DESCRIPTION

Figure 3:
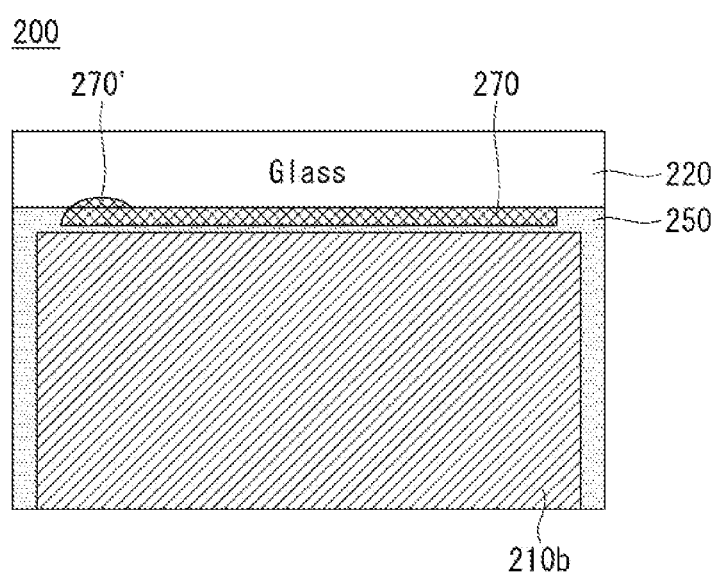
FIG. 3 is a front view of the display device illustrated in FIG. 2.

Hereinafter, exemplary embodiments of the present invention will be described in detail with reference to the accompanying drawings. Like reference numerals designate substantially like elements throughout the specification. In the following description, detailed descriptions of well-known functions or configurations associated with the present invention will be omitted if they are deemed to unnecessarily obscure the subject matters of the present invention. The names of the elements used in the following description may be selected for ease of writing the specification, and may be different from the names of parts in actual products.

FIG. 1 is a cross-sectional view of a related art display device.

Referring to FIG. 1, a display device 100 comprises a lower substrate 120, an upper substrate 140 opposite the lower substrate 120, and an antistatic film 150 positioned on the upper substrate 140. A lower polarizer 110a is positioned on an outer surface (bottom in the figure), a cell 130 is positioned between the lower substrate 120 and the upper substrate 130, and touch electrodes TE may be disposed within the cell 130. Meanwhile, an upper polarizer 110b is positioned on the upper substrate 140, and the antistatic film 150 is positioned on the upper polarizer 110b.

The display device 100 of FIG. 1 is an in-cell type display device 100 in which the touch electrodes TE are positioned within the cell 130. However, this is merely an example for convenience of explanation. For example, the cell 130 may be a liquid crystal layer, and the display device 100 may be a liquid crystal display.

Meanwhile, the antistatic film 150 may be made of indium tin oxide (ITO) or indium zinc oxide (IZO), which are transparent conductive materials, or may be made of a conductive polymer, for example, PEDOT:PSS (polyethylenedioxythiphen:polystyrene sulfonic acid). However, indium tin oxide (TIO) and indium zinc oxide (IZO) are very expensive metals, which is a factor for the rise in manufacturing costs. Especially, the price of indium, a rare metal, which is the main raw material of indium tin oxide (TIO) and indium zinc oxide (IZO), has increased rapidly in recent years, and its supply is currently restricted due to the export control policy of the resource holding countries. Moreover, since indium tin oxide (TIO) and indium zinc oxide (IZO) have relatively low sheet resistance and high electrical conductivity, a capacitance generated with the touch of a finger or the like is discharged by the antistatic film 150, and therefore the touch sensors are not able to detect touch. Further, the antistatic film 150, if made of a material like PEDOT:PSS, may bring a deterioration in reliability under high-temperature or high-humidity environments.

Meanwhile, the antistatic film 150 is connected to the edge of the lower substrate 120 via a first conductive member 170a, a conductive connecting member 172, and a second conductive member 170b. Although not shown, ground pads, etc. made of a conductive material may be positioned on the edge of the lower substrate 120. Static electricity generated in the display device 100 is discharged because of the conductive materials of the first conductive member 170a, conductive connecting member 172, second conductive member 170b, and lower substrate 120.

The first conductive member 170a and the second conductive member 170b may be made of a metal material, e.g., silver (Ag), and the conductive connecting member 170 also may be made of a metal material. However, when forming the first conductive member 170a, the conductive connecting member 172, and the second conductive member 170 separately, the number of processes increases and this increases the manufacturing costs.

Hereinafter, an antistatic film and a display device comprising the same according to exemplary embodiments of the present invention to be described below can solve the above-described problems.

Now, exemplary embodiments of the present invention will be described in detail with reference to the accompanying drawings.

First Exemplary Embodiment

Figure 4:
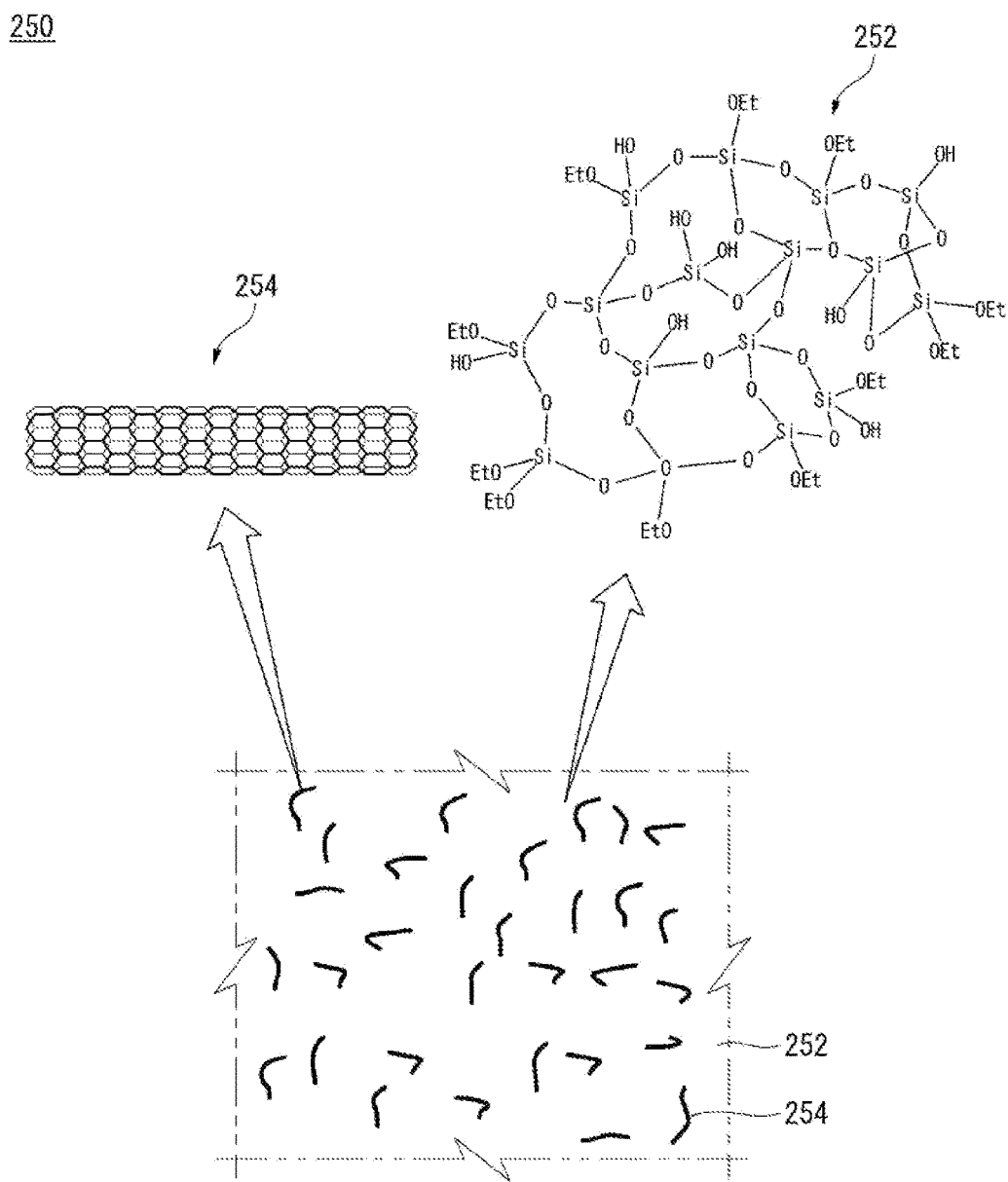
FIG. 4 is a plan view of an antistatic film according to an exemplary embodiment of the present invention, showing the exemplary composition of the carbon nanotubes and matrix material thereof.

FIG. 2 is a cross-sectional view of a display device according to an exemplary embodiment of the present invention. FIG. 3 is a front view of the display device of FIG. 2. FIG. 4 is a plane view of an antistatic film according to an exemplary embodiment of the present invention.

Referring to FIGS. 2 to 4, a display device 200 comprises a display panel 205 positioned on a lower polarizer 210a, an upper polarizer 210b positioned on the display panel 205, and an antistatic film 250 disposed between the upper substrate 240 of the display panel 205 and the upper polarizer 210b.

More specifically, the display panel 205 comprises a lower substrate 220, a cell 230, and an upper substrate 240, which are sequentially stacked. Here, the lower substrate 220 may be an array substrate 220 where transistors for driving the cell 230 and various kinds of signal lines and electrodes are formed, and the upper substrate 240 may be a color filter substrate 240 where color filters (not shown) and a black matrix (not shown) are formed. In this specification, the lower substrate 220 may refer to the array substrate 220, and the upper substrate 240 may refer to the color filter substrate 240. The lower substrate 220 and the upper substrate 240 may be made of glass, for example, but are not limited to it.

The display panel 205 may be a liquid crystal panel 205 comprising a liquid crystal layer, and the display device 200 may be a liquid crystal display 200. While this specification mainly describes the liquid crystal display 200, the present invention is not limited to it. For example, the cell 230 may be an organic layer of an organic light-emitting display. In cases where the display device 200 is a liquid crystal display 200, liquid crystals may be included in the cell 230. Thus, an electric field generated by applying a voltage to the electrodes on the substrates 220 and 240 causes the liquid crystals to move and therefore the transmittance of light changes, thus allowing the liquid crystal display 200 to display images.

Touch electrodes may be formed in the cell 230. As described above, the display device 200 may be an in-cell type display device 200, and therefore touch electrodes TE for touch functionality—for example, Rx and Tx electrodes—are embedded in the cell 230. The in-cell touch type liquid crystal display 200 has advantages, such as slim profile, improved cost structure owing to the reduction in the cost of raw materials, and lightweight, since touch electrodes are formed inside the display panel, without a separate touch panel attached on the liquid crystal display. For example, although not shown, a structure for implementing touch functionality may be an in-plane switching (IPS) mode, but is not limited to it.

The lower polarizer 210a and the upper polarizer 210b perform a function of polarizing light and emitting it out of the liquid crystal display 200. However, static electricity may be generated when the lower polarizer 210a and the upper polarizer 210b are attached to the display panel 205. Moreover, static electricity may be generated when driving the liquid crystal display 200 for displaying images.

The antistatic film 250 is disposed to eliminate such static electricity. The antistatic film 250 comprises a matrix material 252 and carbon nanotubes (CNT) 254 dispersed in the matrix material 252, and the antistatic film 250 may have a sheet resistance of $10^4$ Ω/sq to $10^9$ Ω/sq. More preferably, the antistatic film 250 may have a sheet resistance of $10^7$ Ω/sq to $10^9$ Ω/sq. More specifically, the antistatic film 250 may be formed by curing a solution comprising the matrix material 252, the carbon nanotubes 254 dispersed in the matrix material 252, a dispersed additive, etc. The antistatic film 250 can improve thermal resistance and reliability by comprising the carbon nanotubes 254 dispersed in the matrix material 252. A more detailed description of the composition of the antistatic film 250 will be given later.

The carbon nanotubes 254 dispersed across the entire surface of the antistatic film 250 exhibit very high hardness and strength in terms of structure because they are composed of $SP^2$ bonds between carbon atoms. Especially, single-walled carbon nanotubes (SWCNT) may be used as a high-strength/ultralight composite material since they have a Young's modulus of 5.5 TPa and a tensile strength of up to 45 GPa.

The carbon nanotubes 254 may have a sheet resistance of 1,000 Ω/sq to 20,000 Ω/sq. As for the in-cell touch type liquid crystal display 200, if the antistatic film 250 has an excessively low sheet resistance (below $10^4$ Ω/sq), a capacitance generated with the touch of a finger or the like is discharged by the antistatic film 150, and therefore the touch sensors are not able to detect touch. As such, there is a need to increase the sheet resistance of the antistatic film 250 and thus to increase the sheet resistance of the carbon nanotubes 254 to a range of 1,000 Ω/sq to 20,000 Ω/sq.

If the carbon nanotubes 254 have a sheet resistance of below 1,000 Ω/sq, the sheet resistance of the antistatic film 250 becomes lower, which may result in degradation in touch sensitivity due to discharge. By contrast, if the carbon nanotubes 254 have a sheet resistance of above 20,000 Ω/sq, the sheet resistance of the antistatic film 250 becomes too higher, which may result in a reduction in the discharge effect.

The content of carbon nanotubes 254 in the antistatic film 250 may be adjusted depending on a design value of light transmittance. Since the light transmittance of the antistatic film 250 decreases as the content of carbon nanotubes 254 increases, the content may be adjusted according to the light transmittance required for the product.

Meanwhile, the antistatic film 250 may have a uniform sheet resistance across the entire surface—specifically, $10^4$ Ω/sq to $10^9$ Ω/sq, and preferably, $10^7$ Ω/sq to $10^9$ Ω/sq. As for the in-cell touch type liquid crystal display 200, if the antistatic film 250 has an excessively low sheet resistance (below $10^4$ Ω/sq), a capacitance generated with the touch of a finger or the like is discharged by the antistatic film 150, and therefore the touch sensors are not able to detect touch. As such, the antistatic film 250 requires relatively high resistance. By contrast, if the antistatic film 250 has an excessively high sheet resistance (above $10^9$ Ω/sq), this provides superior touch sensitivity but slows down the discharge of static electricity, thus reducing the discharge effect.

Accordingly, the antistatic film 250 of the display device 200 according to the exemplary embodiment of the present invention requires a sheet resistance of $10^4$ Ω/sq to $10^9$ Ω/sq, and this allows the display device 200 to discharge static electricity, thereby avoiding failures caused by static electricity and preventing degradation in touch sensitivity.

Meanwhile, one end of the antistatic film 250 is connected to the edge of the lower substrate 220 of the display panel 205 via the conductive member 270. Here, the conductive member 270 joins the antistatic film 250 and metal pads (or ground pads; not shown) of the lower substrate 220 of the display panel 205. Specifically, the conductive member 270 serves as a passage to release static electricity out of the device by covering the edge of the outer surface of the antistatic film 250 and making contact with the metal pads (not shown) via a connecting portion 270'. The conductive member 270 may be made of a metal material such as gold, silver, or copper, for example.

As compared to the first conductive member 170a, conductive connecting member 172, and second conductive member 170b of the typical display device 200 shown in FIG. 1, the conductive member 270 alone can perform the function of releasing static electricity. This can reduce the number of processes and shorten the processing time, leading to reduced manufacturing costs.

However, it should be noted that the shape, arrangement, etc. of the conductive member 270 of the display device 200 shown in FIGS. 2 and 3 are for illustration only and the embodiments are not limited to them.

First Experimental Example

The effects of an exemplary embodiment of the present invention will be described below with reference to the attached tables and graphs.

Figure 5:
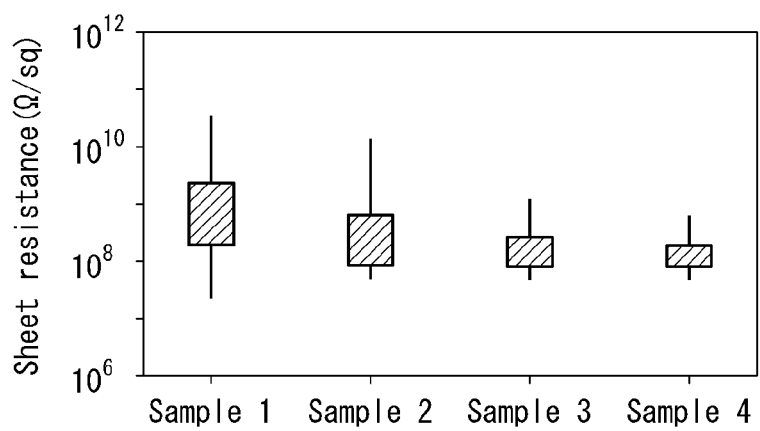
FIG. 5 is a graph showing the sheet resistance of an antistatic film and the sheet resistance of carbon nanotubes according to an exemplary embodiment of the present disclosure.

FIG. 5 is a graph showing the sheet resistance of an antistatic film relative to the sheet resistance of carbon nanotubes according to an exemplary embodiment of the present disclosure.

As shown in Table 1 below, as the sheet resistance of the antistatic film was increased from 477 Ω/sq to 1,800 Ω/sq, the sheet resistance uniformity of the antistatic film increased from 17.32% to 6.67%. In other words, this means that the differences in sheet resistance between each region of the antistatic film were reduced.

TABLE 1

| Sample | Sheet resistance (Ω/□) | Unif. (%) | Sheet resistance of CNT (Ω/□) | Hardness (H) |
| --- | --- | --- | --- | --- |
| 1 | $10^{7.4}$~$10^{10.5}$ | 17.32 | 477 | 8 |
| 2 | $10^{7.7}$~$10^{10.1}$ | 12.22 | 1420 | 8 |
| 3 | $10^{7.7}$~$10^{9.1}$ | 8.33 | 1466 | 8 |
| 4 | $10^{7.7}$~$10^{8.8}$ | 6.67 | 1800 | 8 |

As described above, in order for an in-cell liquid crystal display to perform discharge while at the same time maintaining touch sensitivity, the antistatic film requires a sheet resistance range of $10^7$ Ω/sq to $10^9$ Ω/sq.

However, Sample 1 has a sheet resistance range of $10^{7.4}$ Ω/sq to $10^{10.5}$ Ω/sq, with a large difference between the highest and lowest sheet resistance values, and Sample 2 also has a sheet resistance range of $10^{7.7}$ Ω/sq to $10^{10.1}$ Ω/sq, with a large difference between the highest and lowest sheet resistance values. Thus, the sheet resistance of Samples 1 and 2 differ greatly from region to region, and their discharge ability is degraded in regions where the sheet resistance is excessively high.

On the other hand, as in the case of Sample 4, if the carbon nanotubes have a sheet resistance of 1,800 Ω/sq, Sample 4 has a sheet resistance of $10^{7.7}$ Ω/sq to $10^{8.8}$ Ω/sq, which allows for performing discharge while at the same time maintaining touch sensitivity.

The graph of the sheet resistance uniformity of the antistatic film is depicted in FIG. 5B. This graph shows that, as the sample number goes up from Sample 1 to Sample 4, the sheet resistance of the carbon nanotubes increases and therefore the sheet resistance uniformity is improved.

Figure 6:
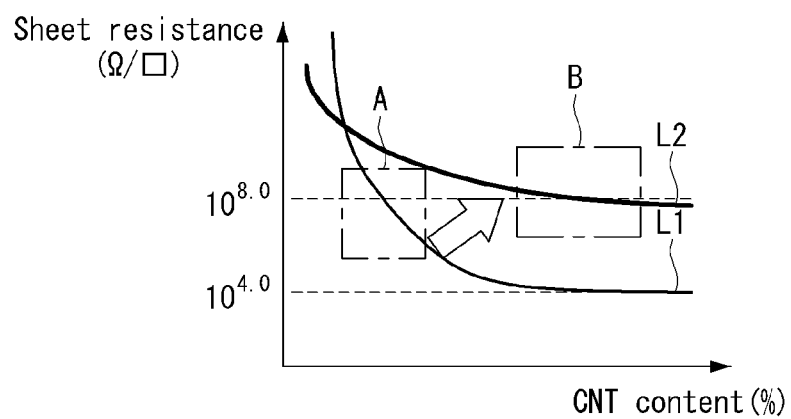
FIG. 6 is a graph showing the sheet resistance of the antistatic film versus carbon nanotube content according to an exemplary embodiment of the present disclosure.

FIG. 6 is a graph showing the sheet resistance of the antistatic film versus carbon nanotube content according to an exemplary embodiment of the present invention.

Referring to FIG. 6, a first line L1 represents the sheet resistance of the antistatic film of a typical liquid crystal display, and a second line L2 represents the sheet resistance of the antistatic film of a display device according to an exemplary embodiment. Also, the display device of FIG. 6 is an in-cell liquid crystal display.

The first line L1 in Region A has a very steep slope when the antistatic film has a sheet resistance of around $10^8$ Ω/sq that allows for performing discharge while at the same time maintaining touch sensitivity. This means that the sheet resistance of the antistatic film may change to a great extent even with a slight change in the carbon nanotube content. In other words, this means that the sheet resistance uniformity is relatively low.

The second line L2 in Region B has a very gentle slope when the antistatic film has a sheet resistance of around $10^8$ Ω/sq. This means that the sheet resistance changes only slightly because the sheet resistance uniformity is relatively high, even with a change in the carbon nanotube content. Accordingly, the display device according to the exemplary embodiment can perform an antistatic function while at the same time maintaining touch sensitivity, even with a change in the carbon nanotube content.

Table 2 shows the light transmittance relative to the content and sheet resistance of carbon nanotubes according to an exemplary embodiment.

Referring to Table 2, this table shows the content and sheet resistance of carbon nanotubes according to a design value of light transmittance. Specifically, a display device that requires a light transmittance of 100% may be designed such that the carbon nanotube content is 0.13% and the carbon nanotubes have a sheet resistance of 1,800 Ω/sq. Also, a display device that requires a light transmittance of 99% or above may be designed such that the carbon nanotube content is 0.26% and the carbon nanotubes have a sheet resistance of 5,000 Ω/sq.

TABLE 2

| Sample | Transmittance (%) | CNT content (%) | Sheet resistance of CNT (Ω/□) | Hardness (H) |
| --- | --- | --- | --- | --- |
| 5 | 100 | 0.13 | 1500 | 8 H |
| 6 | 100 | 0.13 | 1800 | 8 H |
| 7 | 99.5 | 0.26 | 5000 | 8 H |
| 8 | 99.4 | 0.26 | 7000 | 8 H |
| 9 | 98.7 | 0.26 | 10000 | 8 H |
| 10 | 98.5 | 0.26 | 19000 | 8 H |

As can be seen from Table 2, it is found that the light transmittance can be adjusted by adjusting the content and sheet resistance of carbon nanotubes, as long as the antistatic film has a sheet resistance that allows for performing discharge while at the same time maintaining touch sensitivity.

Figure 7A:
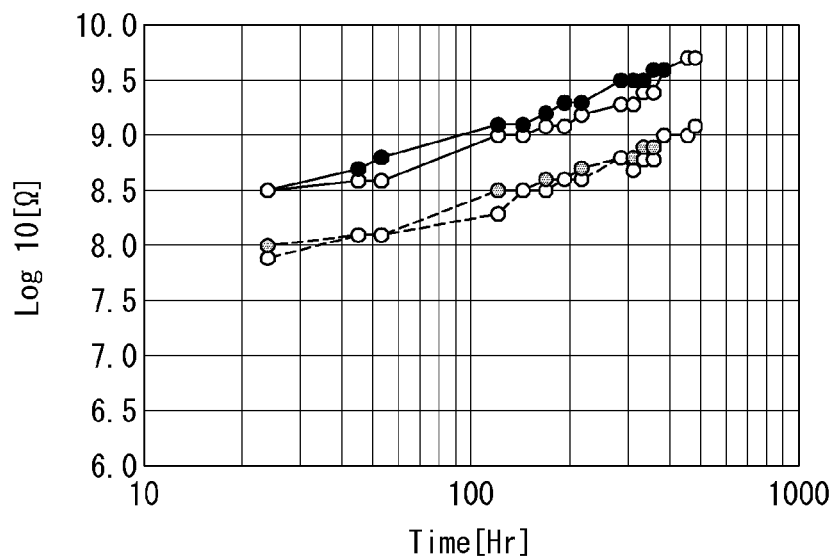
FIG. 7A is a graph showing changes in the sheet resistance of a typical antistatic film over time.
Figure 7B:
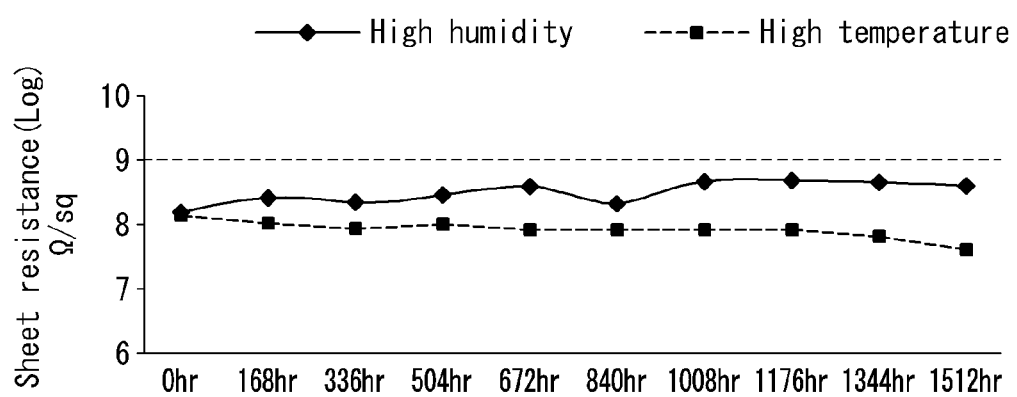
FIG. 7B is a graph showing changes in the sheet resistance of an antistatic film according to an exemplary embodiment in high-temperature, high-humidity environments.

FIG. 7A is a graph showing changes in the sheet resistance of a typical antistatic film over time, and FIG. 7B is a graph showing changes in the sheet resistance of an antistatic film according to an exemplary embodiment in high-temperature, high-humidity environments.

FIG. 7A shows changes in the sheet resistance of an antistatic film made of a conductive polymer called PEDOT:PSS over time in a 95° C. environment. This graph shows a continuous increase in sheet resistance over time. Specifically, this graph reveals that the sheet resistance rose up to 9.7 Ω/sq when the initial sheet resistance was set to approximately 8.5 Ω/sq, and the sheet resistance rose up to 9.2 Ω/sq when the initial sheet resistance was set to approximately 8.0 Ω/sq.

On the other hand, referring to FIG. 7B, it was found that the antistatic film according to the exemplary embodiment showed almost no change in sheet resistance when the antistatic film had an initial sheet resistance of around 8.0 Ω/sq and was exposed to 105° C. for 1,500 hours. Similar results were obtained when the antistatic film was exposed to a high-humidity environment.

Accordingly, it is concluded that the antistatic film according to the exemplary embodiment has better thermal resistance and reliability than the typical antistatic film.

Figure 8:
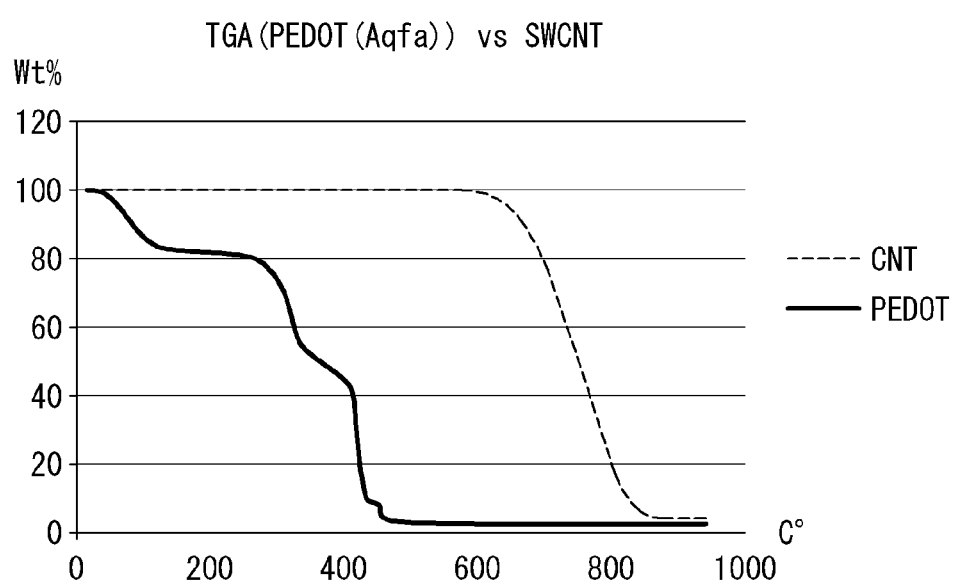
FIG. 8 is a graph comparing the percentage by weight of a related art antistatic film over temperature and the percentage by weight of an antistatic film over temperature according to an exemplary embodiment.

FIG. 8 is a graph showing a comparison between the percentage by weight of a typical antistatic film over temperature and the percentage by weight of an antistatic film over temperature according to an exemplary embodiment.

Referring to FIG. 8, this graph shows the results of analyzing the typical antistatic film and the antistatic film according to the exemplary embodiment by a thermogravimetric analyzer (TGA). The thermogravimetric analyzer is an instrument that measures changes in the mass of samples by heating the samples.

It was observed that, in the case of the antistatic film of the typical liquid crystal display, the PEDOT:PSS, a conductive polymer, comprised in the antistatic film was all lost due to heat at a temperature of approximately 500° C. By contrast, it was observed that, in the case of the antistatic film of the antistatic film of the display device according to the exemplary embodiment, the carbon nanotubes were not lost but left up to approximately 900° C.

Accordingly, it is concluded that the antistatic film according to the exemplary embodiment has better thermal resistance and reliability than the typical antistatic film.

To sum up, a liquid crystal display with touch functionality can avoid failures caused by static electricity, prevent degradation in touch sensitivity, improve sheet resistance uniformity, thermal resistance, and reliability, and reduce manufacturing costs by easily discharging static electricity generated during the manufacturing process by means of an antistatic film 250 with a sheet resistance of $10^7$ Ω/sq to $10^9$ Ω/sq uniformly across the entire surface.

Second Exemplary Embodiment

Now, a description will be given of a carbon nanotube dispersion liquid composition and a conductive coating liquid composition comprising the same, which are used to manufacture the above-described antistatic film according to the first exemplary embodiment of the present invention.

Figure 9:
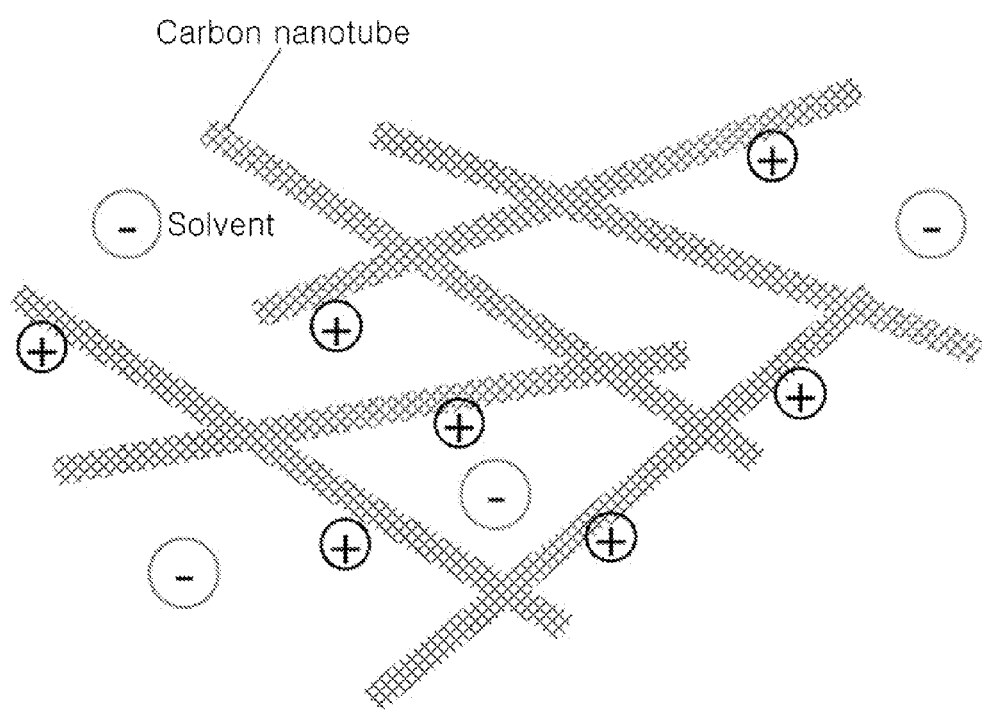
FIGS. 9 and 10 are exemplary illustrations of the dispersion of carbon nanotubes.
Figure 10:
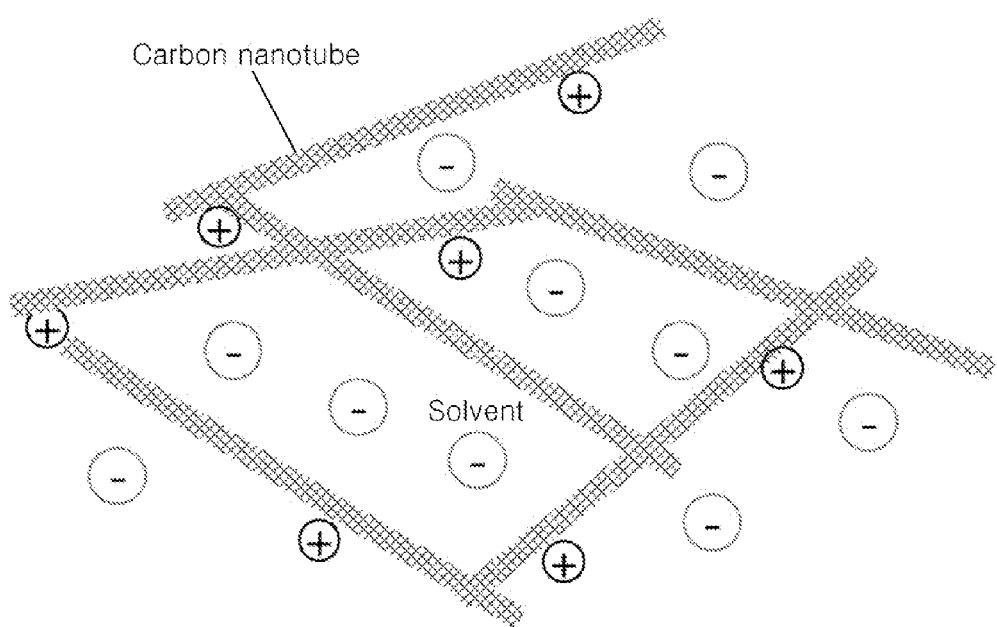

FIGS. 9 and 10 are pattern diagrams of examples of dispersion of carbon nanotubes.

The present invention relates to a carbon nanotube dispersion liquid composition and a conductive coating liquid composition comprising the same, and more particularly, to a carbon nanotube dispersion liquid composition and a conductive coating liquid composition comprising the same which can remarkably improve the dispersibility of carbon nanotubes and their stability after dispersion by comprising carbon nanotubes, polyacrylic acid resin, and a straight-chain alkanol with 2 to 5 carbon atoms, and which form a coating film with excellent chemical stability and electrical conductivity that is used in the conductive coating liquid composition, along with a silane sol and improve the uniformity of the formed coating film.

<Carbon Nanotube Dispersion Liquid Composition>

The carbon nanotube dispersion liquid composition according to the present invention comprises carbon nanotubes, polyacrylic acid resin, and a straight-chain alkanol with 2 to 5 carbon atoms.

Carbon Nanotubes

Carbon nanotubes are a material with excellent electrical conductivity. A coating film made of carbon nanotubes can be used as conductive layers, antistatic films, etc. in electronics such as display devices owing to their excellent electrical conductivity and mechanical strength.

The carbon nanotubes (CNT) may be produced by typical techniques, including arc discharge, laser deposition, plasma chemical vapor deposition, vapor synthesis, and pyrolysis, and then thermally treated. Along with carbon nanotubes, carbon impurities such as amorphous carbon or crystalline graphite particles, and catalytic transition-metal particles are present in products of the above synthesis methods. For instance, in the case of arc discharge, 15 to 30 wt % of carbon nanotubes, 45 to 70 wt % of carbon impurities, and 5 to 25 wt % of catalytic transition-metal particles are comprised in 100 wt % of the product. The use of carbon nanotubes comprising such impurities without purification will deteriorate the dispersibility and coatability of an impregnating solution and make it difficult properly exhibit the unique physical properties of carbon nanotubes. Accordingly, the present invention uses carbon nanotubes which have as many impurities removed as possible by thermally treating the product of arc discharge.

Specifically, the product obtained by the above synthesis method is made into a sheet or granules having an average diameter of 2 to 5 mm and then fed into a rotary reactor that is inclined downwards at 1 to 5° with respect to the direction of forward movement (horizontal), and then oxidized gas is supplied to 1 g of the fed product at 200 to 500 cc/min while heating the rotary reactor at 350 to 500° C., followed by thermal treatment for 60 to 150 minutes. In this case, as the inclined rotary reactor rotates at 5 to 20 rpm, the product is dispersed to thus maximize the area of surface contact, and at the same time, the product is moved automatically in the direction of forward movement to thus maximize the area of surface contact with the oxidized gas and then thermally treated while preventing local oxidation. By this method, the weight of the fed product can be reduced by 60 to 85%, thereby obtaining high-purity carbon nanotubes.

The carbon nanotubes may contain 40 wt % or less of carbon impurities, more preferably, 25 wt % or less of carbon impurities, based on 100 wt % of the carbon nanotubes, in order to ensure dispersion, stability, and electrical conductivity.

The carbon nanotubes may be single-walled carbon nanotubes, double-walled carbon nanotubes, or multi-walled carbon nanotubes, and these carbon nanotubes may be used alone, or two or more kinds of them may be used in combination. Single-walled carbon nanotubes are more preferable in terms of improvement in interactions with other components to be described later.

The content of carbon nanotubes according to the present invention is not specifically limited, but may be, for example, 0.05 to 20 wt % of the total weight of the dispersion liquid composition; preferably, 0.1 to 10 wt %; more preferably, 0.1 to 1 wt %. Within this range, the carbon nanotubes may exhibit high dispersibility, and a coating film made of these carbon nanotubes ensures electrical conductivity, scratch resistance, and transmittance.

Polyacrylic Acid Resin

A polyacrylic acid resin according to the present invention is a component that acts as a dispersant for effectively dispersing carbon nanotubes. The polyacrylic acid resin dissolves easily in a particular dispersant to be described later, and may bind readily to carbon nanotubes, which are hydrophobic. Moreover, the polyacrylic acid resin may improve the dispersibility of carbon nanotubes and prevent reaggregation through electrostatic repulsion between carbon nanotube strands and through steric hindrance using the unique properties of polymer chains.

The content of polyacrylic acid resin according to the present invention is not specifically limited, but may be, for example, 0.02 to 40 wt % of the total weight of the dispersion liquid composition; preferably, 0.05 to 10 wt %; more preferably, 0.1 to 1 wt %. Within this range, the polyacrylic acid resin is dissolved to an appropriate extent within the composition, thereby remarkably improving its activity in dispersing carbon nanotubes.

The weight-average molecular weight of the polyacrylic acid resin according to the present invention is not specifically limited, but may range, for example, from 2,000 to 3,000,000; preferably, from 8,000 to 12,000. Within this range, the polyacrylic acid resin may easily permeate between carbon nanotube strands and provide a steric hindrance effect suitable for reaggregation. Moreover, the polyacrylic acid resin may exist in a well-dissolved state in the dispersant within the dispersion liquid composition, thereby effectively dispersing the carbon nanotubes.

The dispersion liquid composition of this invention may contain a very small amount of water. Hence, the polyacrylic acid resin may be comprised in the dispersion liquid, dissolved or emulsified in water, but the present invention is not limited to this.

Straight-Chain Alkanol with 2 to 5 Carbon Atoms

A straight-chain alkanol with 2 to 5 carbon atoms according to the present invention is a dispersion medium for effectively dispersing carbon nanotubes. Also, it is a hydrophilic alcohol-based solvent that can remarkably improve the dispersion stability of carbon nanotubes by interactions with the above-described polyacrylic acid resin. If a branched-chain alkanol, instead of a straight-chain alkanol, is used as the dispersion medium, the solubility and stability of the polyacrylic acid resin in the dispersion medium will be significantly lowered, making it difficult to keep dispersion stability at an appropriate level. However, the present invention should not be construed as being limited to this.

Concrete examples of the straight-chain alkanol with 2 to 5 carbon atoms according to the present invention may include ethanol, n-propanol, n-butanol, and n-pentanol; preferably, at least one among ethanol, n-protanol, n-butanol, and n-pentanol; more preferably, n-propanol.

The content of the alkanol according to the present invention is not specifically limited, but may be, for example, 50 to 99.93 wt % of the total weight of the composition; preferably, 80 to 99 wt %. Within this range, the viscosity of the dispersion liquid may be kept low, thereby further improving the dispersion stability of the carbon nanotubes, and the alkanol may be mixed effectively with a binder component when used in a coating film.

Additional Dispersant

A carbon nanotube dispersion liquid composition according to the present invention may further comprise an additional dispersant, and the additional dispersant is not limited to a specific type, but may be, for example, an acrylic block copolymer dispersant.

In the present invention, the term "acrylic block copolymer" refers to a copolymer made up of blocks of different polymerized acrylic monomers—for example, a copolymer with A and B monomer units arranged in the pattern of AAAAAABBBBBB. The acrylic block copolymer may further improve dispersion stability by separating the polarity of a carbonyl group in the copolymer. Preferably, each monomer unit in the acrylic block copolymer may comprise at least one functional group such as an amine group, carboxyl group, etc., and the ratio between hydrophilic and hydrophobic components may be adjusted by adjusting the content of monomer units comprising the substituent, thereby further improving the dispersibility of carbon nanotubes. Concrete examples of the acrylic copolymer dispersant available on the market may include polymer dispersants DISPERBYK 2001 and DISPERBYK 2155 from BYK company.

The content of the additional dispersant is not specifically limited, but may be, for example, 0.1 to 2 wt % of the total weight of the composition; preferably, 0.5 to 1 wt %. Within this range, it is possible to prevent degradation in scratch resistance and increase in viscosity due to the use of the additional dispersant, and the dispersion stability may be effectively maintained.

The carbon nanotube dispersion liquid composition of this invention may contain a very small amount of water as required. Water may be used to improve the solubility and dispersibility of the above-described components. For example, water may be used as a solvent for improving the dispersion activity of the polyacrylic acid resin, but the present invention is not limited to this.

Method of Preparing Carbon Nanotube Dispersion Liquid Composition

A method of preparing a carbon nanotube dispersion liquid comprising the above-described components will be described below.

First, carbon nanotubes, polyacrylic acid resin, and a straight-chain alkanol with 2 to 5 carbon atoms are mixed together. The polyacrylic acid resin may be prepared in aqueous solution in advance before the mixing. The concentration of the aqueous solution is not specifically limited, but the solid content of the polyacrylic acid resin may be preferably 0.02 to 40 wt % of the total content of the carbon nanotube dispersion liquid composition, more preferably, 20 to 30 wt %. The specific type and content of each component of the carbon nanotube dispersion liquid composition are as described above.

Next, the respective components of the carbon nanotube dispersion liquid are mixed together, and then dispersed at a high pressure of 1,000 to 1,800 bar. When dispersed under a high pressure of 1,000 to 1,800 bar, the carbon nanotubes may collide with each other with an appropriate shear stress, and therefore carbon nanotube strands may be effectively dispersed. As a result, the carbon nanotubes are homogeneously dispersed in the composition without aggregation, thereby effectively promoting interactions between the polyacrylic acid resin and the alkanol.

When dispersed at a pressure below 1,000 bar, the energy delivered to the carbon nanotubes is low, thus significantly reducing the dispersion effect. At a pressure above 1,800 bar, the polymer chains of the polyacrylic acid resin may break apart due to excessively high energy, and this may reduce the steric hindrance effect, thereby lowering dispersion stability. More preferably, the dispersion pressure may be 1,200 to 1,600 bar, in which case, the above-described effects may be further improved.

The dispersion may be performed by jetting the composition through a nozzle with a predetermined diameter in the above-mentioned pressure range. The diameter of the nozzle through which the composition is jetted may be 50 to 400 preferably, 80 to 200 Moreover, the dispersion may be performed simultaneously by using nozzles of different sizes connected in series, or twice separately by using the respective nozzles.

By using nozzles within the above diameter range, the process may be performed easily at a high temperature of 1,000 to 1,800 bar, as described above, thereby achieving effective dispersion.

The diameter and flow rate of nozzles may be chosen within an appropriate range to match the pressure range.

Moreover, a stirring process may be performed prior to the high-pressure dispersion process. This may optimize the mixing of the composition, thereby further improving the efficiency of the high-pressure dispersion process.

[Conductive Coating Liquid Composition]

Hereinafter, a conductive coating liquid composition comprising 10 to 100 parts by weight of a silane sol based on 100 parts by weight of the above-described carbon nanotube dispersion liquid composition will be described.

<Carbon Nanotube Dispersion Liquid Composition>

The carbon nanotube dispersion liquid composition may contain the same components in the same proportions, and may be prepared by high-pressure dispersion.

<Silane Sol>

A silane sol according to the present invention acts as a binder in the coating liquid composition, and may contain an alkoxysilane compound, an acid catalyst, an alcohol-based solvent, and water.

Alkoxysilane Compound

An alkoxysilane compound according to the present invention is a binder resin, and is not limited to a specific type. Examples of the alkoxysilane compound may include: tetraalkoxysilane compounds, such as tetraethoxysilane, tetramethoxysilane, and tetra-n-propoxysilane; alkylalkoxysilanes of substituted or unsubstituted, straight- or branched-chain alkyl groups, such as methyltrimethoxysilane, methyltriethoxysilane, ethyltriethoxysilane, ethyltrimethoxysilane, methyltripropoxysilane, methyltributoxysilane, propyltrimethoxysilane, propyltriethoxysilane, isobutyltriethoxysilane, isobutyltrimethoxysilane, octyltriethoxysilane, octyltrimethoxysilane, and methacryloxydecyltrimethoxysilane; phenyltrimethoxysilane, phenyltriethoxysilane, phenyltripropoxysilane, and phenyltributoxysilane; 3-aminopropyltrimethoxysilane, 3-aminopropyl-triethoxysilane, 2-aminoethyl-3-aminopropyltrimethoxysilane, N-β-(aminoethyl)-γ-aminopropyltrimethoxysilane, N-(n-butyl)-3-aminopropyltrimethoxysilane, 3-aminopropylmethyldiethoxysilane; dimethyldimethoxysilane, diethyldiethoxysilane, γ-glycidyloxypropyltrimethoxysilane, γ-glycidyloxypropyltrimethoxysilane, vinyltrimethoxysilane, vinyltriethoxysilane, 3-mercaptopropyltrimethoxysilane; and fluoroalkylsilanes, such as tridecafluoro-1,1,2,2-tetrahydrooctyltriethoxysilane, trifluoropropyltrimethoxysilane, heptadecafluorodecyltrimethoxysilane, and heptadecafluorodecyltriisopropoxysilane. These may be used alone, or two or more of these alkoxysilane compounds may be used in combination.

Of these, an alkylalkoxysilane compound with an alkyl group of 1 to 20 carbon atoms is most preferable, and more preferably, a tetraethoxysilane compound may be used.

The content of the alkoxysilane compound according to the present invention is not specifically limited, but may be, for example, 20 to 60 wt % of the total weight of the silane sol; preferably, 30 to 50 wt %. Within this range, a sol-gel reaction occurs readily, and therefore the obtained silane sol has good physical properties and high adhesion, thereby facilitating the formation of a coating film and making it more suitable, especially for coating a glass substrate.

Acid Catalyst

An acid catalyst according to the present invention is used to promote the hydrolysis of water and alkoxysilane and provide an appropriate degree of crosslinking. A weak acid aqueous solution with a pH of 3.0 to 6.0 may be used as the acid catalyst.

In the present invention, the acid catalyst performs two important actions. First, the acid catalyst delays the reduction process of curing defects in carbon nanotubes. As shown in FIG. 9, defects such as OH—, $O_2$, etc. exist in the carbon nanotubes, and the lower the pH of the composition, the more quickly these defects in the carbon nanotubes are cured and the higher the electrical conductivity. By using a weak acid with a pH of 3.0 to 6.0 as the acid catalyst of this invention, the reduction process of curing defects in the carbon nanotubes works slowly. With this slow reduction process of curing defects in the carbon nanotubes, the composition undergoes little change in sheet resistance, thereby improving the storage stability of the composition when left at room temperature.

Second, the acid catalyst controls the gel reaction speed of the silane sol. As shown in FIG. 10, the gel reaction time gets slower as the pH goes from 2 to 8. In the present invention, an acid catalyst with a pH of 3.0 to 6.0 is used to slow down the gel reaction speed of the silane sol. By slowing down the gel reaction speed of the silane sol, the final composition undergoes less change in viscosity, thereby improving the storage stability of the composition when left at room temperature.

Accordingly, the present invention may use an acid catalyst with a pH of 3.0 to 6.0, and examples of the acid catalyst may include phosphoric acid, hydrogen fluoride, benzoic acid, carbonic acid, and hydrogen sulfide. These acid catalysts may be used alone, or two or more kinds of them may be used in combination. The acid catalyst used may exist in aqueous solution when mixed. Here, if the pH of the acid catalyst is 3.0 or higher, this slows down the reduction process of the carbon nanotubes and the gel reaction of the silane sol, thereby improving the storage stability of the composition. If the pH of the acid catalyst is 6.0 or lower, the hydrolysis and condensation reactions of the silane sol do not occur properly, thereby preventing the formation of a thin film.

The content of the acid catalyst according to the present invention is not specifically limited, but may be, for example, 0.01 to 10 wt % of the total weight of the silane sol; preferably, 0.05 to 5 wt %. Within this range, it is possible to form a coating film with an appropriate degree of crosslinking.

Alcohol-Based Solvent

The type of an alcohol-based solvent according to the present invention is not specifically limited, but a hydrophilic alcohol-based solvent may be preferably used in terms of compatibility with a carbon nanotube dispersion liquid, and examples of the alcohol-based solvent may include methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol. These alcohol-based solvents may be used alone, or two or more kinds of them may be used in combination. Of these, in terms of improvement in stability with the carbon nanotube dispersion liquid, ethanol, n-butanol, n-propanol, and n-pentanol are preferably used; more preferably, n-propanol may be used.

The content of the alcohol-based solvent according to the present invention is not specifically limited, but may be, for example, 10 to 70 wt % of the total weight of the silane sol; preferably, 20 to 50 wt %. Within this range, the reactivity of the sol-gel reaction may be further improved.

Water

Water according to the present invention is a component that undergoes a hydrolysis reaction with alkoxysilanes, and the water content is not specifically limited, but may be, for example, 5 to 60 wt % of the total weight of the silane sol, preferably 8 to 35 wt %. Within this range, alkoxysilanes are hydrolyzed well enough to provide high adhesion to a substrate.

Polar Solvent

A polar solvent according to the present invention is used to improve the dispersibility of carbon nanotubes in the conductive coating liquid composition and improve electrical conductivity. The polar solvent has a polarity of 10 or higher.

The polar solvent according to the present invention maximizes dispersibility by increasing the force of repulsion of a carboxyl group of polyacrylic acid resin surrounding the carbon nanotubes in the dispersion liquid. This enhances the distribution of the carbon nanotubes acting as conductive fillers in the form of a coating film, thereby improving electrical conductivity. For instance, referring to FIG. 9, if a solvent with a low polarity is comprised in the conductive coating liquid composition, the force of repulsion of the carboxyl group of the polyacrylic acid resin surrounding the carbon nanotubes is low, thereby leading to low dispersibility. On the other hand, referring to FIG. 10, if a solvent with a high polarity is comprised in the conductive coating liquid composition, the force of repulsion of the carboxyl group of the polyacrylic acid resin surrounding the carbon nanotubes is high, thereby leading to high dispersibility.

In addition, the polar solvent according to the present invention helps ensure a proper viscosity at the time of coating, and regulates the drying rate to an appropriate range at the time of coating, thereby obtaining a uniform coating film.

The polar solvent according to the present invention has a polarity of 10 or higher, and examples thereof may include n-methyl pyrolidone (NMP), dimethyl sulphoxide (DMSO), and dimethyl formamide (DMF). N-methyl pyrolidone (NMP), dimethyl sulphoxide (DMSO), and dimethyl formamide (DMF) may contribute to further improvement of electrical conductivity, especially because of their inherent dielectric constants, thus making them more suitable for forming a low-resistance coating film.

The content of the polar solvent according to the present invention may be 0.1 to 5 wt % based on 100 wt % of the conductive coating liquid composition. If the polar solvent content is 0.1 wt % or higher based on 100 wt % of the conductive coating liquid composition, this may improve the dispersibility of the carbon nanotubes and thus improve surface resistance uniformity, making it easy to adjust surface resistance. If the polar solvent content is 5 wt % or lower based on 100 wt % of the conductive coating liquid composition, this may prevent the surface resistance of an antistatic film made of the conductive coating liquid composition from getting too low.

Additives

A conductive coating liquid composition according to the present invention may further contain additives as required, in addition to the above-described carbon nanotube dispersion liquid and silane sol.

Usable additives may include a dispersant, a silane coupling agent, a leveling agent, a slip agent, a surfactant, a pH adjuster, a retarder solvent, a viscosity regulator, etc., but are not limited to them. These additives may be used alone, or two or more kinds of them may be used in combination.

In a more concrete example, the conductive coating liquid composition may further contain a slip agent for improving the slip properties of a coating film. The slip agent is not limited to a specific type, and commercially available examples of the slip agent may include, but are not limited to, BKY 333 of BYK company. Also, the aforementioned dispersant, BKY 2001, may be further used.

Moreover, polar solvents such as ethylenglycol, dimethylformamide, and 1-methyl-2pyrrolydone maximize dispersibility by increasing the force of repulsion of a carboxyl group of polyacrylic acid resin surrounding the carbon nanotubes in the dispersion liquid. This enhances the distribution of the carbon nanotubes acting as conductive fillers in the form of a coating film, thereby improving electrical conductivity. In addition, they help ensure a proper viscosity at the time of coating, and regulate the drying rate to an appropriate range at the time of coating, thereby obtaining a uniform coating film. Further, ethyleneglycol, dimethylformamide, and 1-methyl-2pyrrolydone may contribute to further improvement of electrical conductivity because of their intrinsic dielectric constants, thus making them more suitable for forming a low-resistance coating film.

The additional additives may be used alone, or two or more kinds of them may be used in combination. Their content is not specifically limited, but may be, for example, 0.01 to 10 wt % of the total weight of the conductive coating liquid composition; preferably, 0.1 to 5 wt %. Within this range, the above-mentioned additives may achieve their unique effects without hindering the effects of this invention.

The silane sol according to the present invention may be prepared by getting the above-described components to react to a predetermined condition. The reaction condition is not specifically limited, but may comprise, for example, a process of heating and stirring them at 30 to 90° C., and the reaction time is not specifically limited, but may be, for example, 4 to 30 hours. The reactor where reaction takes place may comprise a reflux condenser tube. After the reaction, the product may be rotavated, concentrated, and then diluted in a particular solvent. Thus, the prepared silane sol may provide strong adhesion, especially when the coating liquid is applied to a glass substrate, and therefore achieve superior strength characteristics.

<Preparation of Conductive Coating Liquid Composition>

A conductive coating liquid composition according to the present invention may be prepared by making a carbon nanotube dispersion liquid and a silane sol, separately, and then mixing the carbon nanotube dispersion liquid and the silane sol together.

The conductive coating liquid composition according to the present invention may be prepared by mixing 10 to 100 parts by weight of the silane sol based on 100 parts by weight of the carbon nanotube dispersion liquid composition.

If the silane sol content in the mixture is less than 10 parts by weight, it is difficult to give the coating layer adhesive force. If the silane sol content in the mixture is more than 100 parts by weight, the coatability of the coating layer may be degraded. Moreover, the silane sol may be mixed in 25 to 60 parts by weight or 10 to 20 parts by weight, based on 100 parts by weight of the carbon nanotube dispersion liquid composition. If the silane sol content in the mixture is 25 to 60 parts by weight, the silane sol is suitable for forming a high-resistance coating film. If the silane sol content in the mixture is 10 to 20 parts by weight, the silane sol is suitable for forming a low-resistance coating film.

The mixing method is not specifically limited, but may be performed by using an ultrasonic disperser, a high-pressure disperser, a homogenizer, a mill, etc. Preferably, the dispersion and stability of the final coating liquid may be achieved by using the same high-pressure dispersion process as in the preparation of the carbon nanotube dispersion liquid.

A coating film made of the conductive coating liquid composition comprising the above-described components may provide uniform and excellent electrical conductivity and excellent mechanical strength, thereby making it suitable for use in image displays.

<Display Device>

A display device having an antistatic film made of the above conductive coating liquid composition will be described. An in-cell touch display according to an exemplary embodiment of the present invention will be described below in detail.

Figure 11:
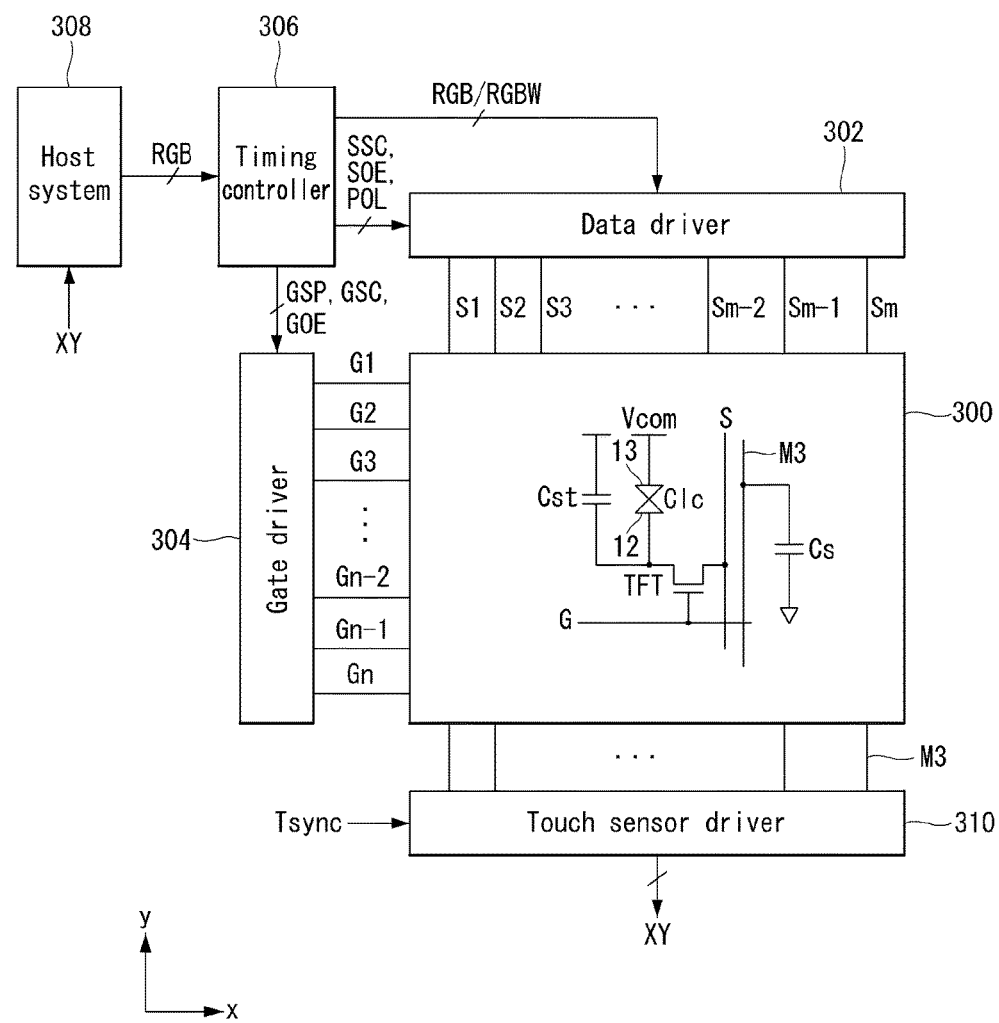
FIGS. 11 and 12 are schematic illustrations of a display device according to an exemplary embodiment of the present disclosure.
Figure 12:
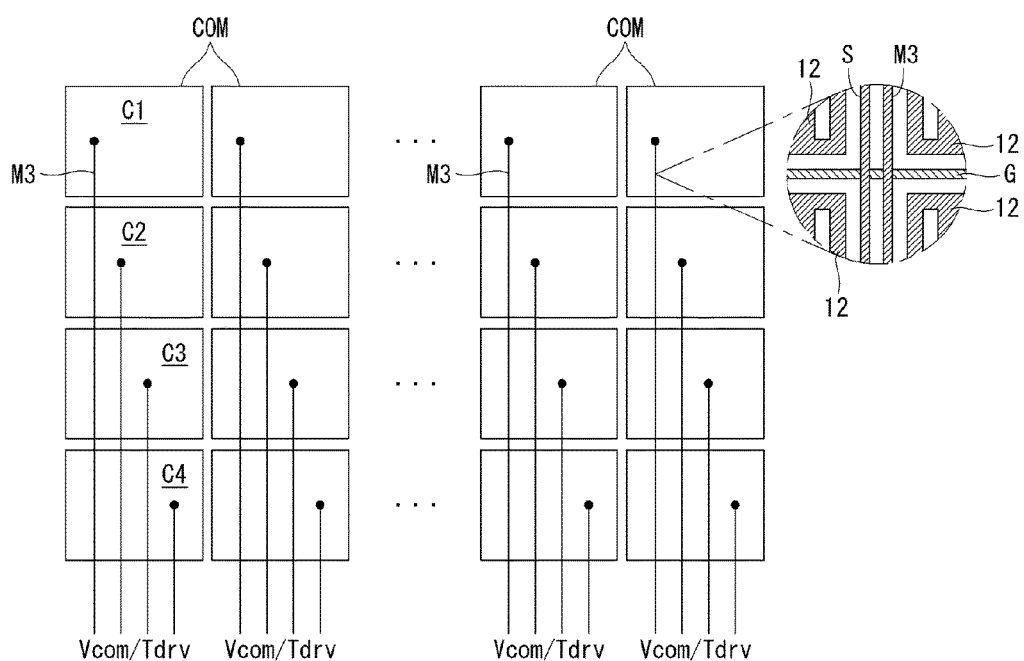
Figure 13:
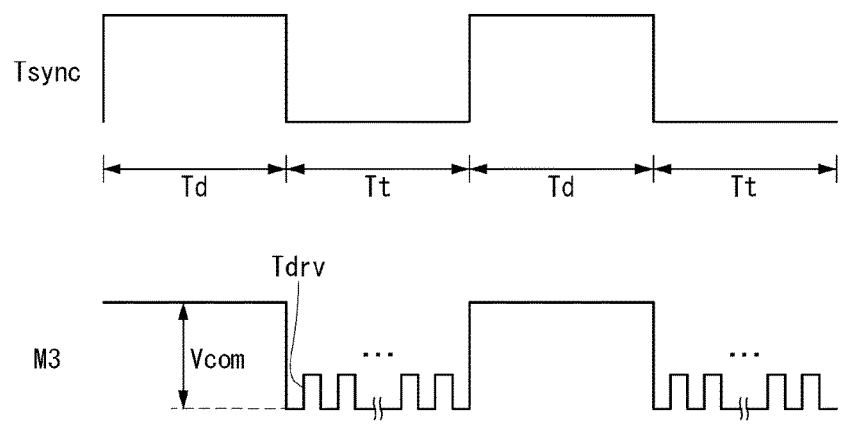
FIG. 13 is a waveform of a common voltage (Vcom) and touch driving signal (TDrv) applied to the touch sensors (Cs) of the display device illustrated in FIG. 11.

FIGS. 11 and 12 are views schematically showing a display device according to the present invention. FIG. 13 is a waveform diagram showing a common voltage Vcom and touch driving signal Tdriv applied to the touch sensors Cs of FIG. 11.

Referring to FIGS. 11 to 13, a display device comprises a touch sensing device. The touch sensing device detects touch input by using touch sensors Cs embedded in a display panel 300. The touch sensing device is able to detect touch input based on a change in the capacitance of the touch sensors Cs because the capacitance increases when a finger makes contact with a self-capacitive touch sensor Cs.

A liquid crystal layer is formed between two substrates on the display panel 300. Liquid crystal molecules are driven by an electric field generated by the potential difference between a data voltage applied to a pixel electrode 12 and a common voltage Vcom applied to a sensor electrode 13. A pixel array on the display panel 300 comprises pixels defined by data lines S (S1 to Sm; m is a positive integer) and gate lines G (G1 to Gn; n is a positive integer) and touch sensors connected to the pixels.

A touch sensor Cs comprises a sensor electrode and a sensor line M3 connected to the sensor electrode. Sensor electrodes COM (C1 to C4) may be patterned by splitting the existing common electrode. Each of the sensor electrodes COM (C1 to C4) overlaps a plurality of pixels. The sensor electrodes COM (C1 to C4) receive, through the sensor lines M3, a common voltage Vcom during a display driving period Td and a touch driving signal Tdry during a touch sensor driving period Tt. The common voltage Vcom is applied commonly to the pixels through the sensor electrodes.

The sensor lines M3 are arranged at boundaries between subpixels, bypassing the area where a spacer will be. The sensor lines M3 may overlap the data lines S1 to Sm, with an insulating layer (not shown) between them, in order to avoid any reduction in the apertures of the pixels.

Since the touch sensors are embedded in the pixel array on the display panel 300, the touch sensors Cs are connected to the pixels through parasitic capacitance. In the present invention, in order to reduce the effects of mutual coupling between the pixels and the touch sensors Cs, as shown in FIG. 13, 1 frame period is time-split into a period for driving the pixels (hereinafter, "display driving period") and a period for driving the touch sensors (hereinafter, "touch sensor driving period") to drive the touch sensors. 1 frame period may be split into at least one display driving period Td and at least one touch sensor driving period Tt. During the display driving period Td, data of an input image is written to the pixels. During the touch sensor driving period Tt, the touch sensors are driven to detect touch input.

The pixels comprise thin film transistors TFT formed at the intersections of the data lines S1 to Sm and the gate lines G1 to Gn, pixel electrodes that receive a data voltage through the TFTs of the pixels, a common electrode to which a common voltage Vcom is applied, and storage capacitors Cst connected to the pixel electrodes to maintain the voltage of the liquid crystal cell.

A black matrix, color filters, etc. may be formed on the upper substrate of the display panel 300. The lower substrate of the display panel 300 may be implemented in a COT (color filter on TFT) structure. In this case, the color filters may be formed on the lower substrate of the display panel 100. Polarizers are respectively attached to the upper and lower substrates of the display panel 300, and an alignment film for setting a pre-tilt angle of liquid crystals is formed on an inner surface contacting the liquid crystals. A spacer is formed between the upper and lower substrates of the display panel 300 to maintain a cell gap for the liquid crystal layer.

A backlight unit may be disposed under the back of the display panel 300. The backlight unit is an edge-type or direct-type backlight unit which illuminates the display panel 300. The display panel 300 may be implemented in any well-known liquid crystal mode, such as a TN (Twisted Nematic) mode, a VA (Vertical Alignment) mode, an IPS (In-Plane Switching) mode, and an FFS (Fringe Field Switching) mode. A self-emitting display device such as an organic light-emitting diode display requires no backlight unit.

The display device according to the present invention further comprises a display drive part 302, 304, and 306 that writes data of an input image to the pixels and a touch sensor driver 310 that drives the touch sensors Cs. The display drive part 302, 304, and 306 and the touch sensor driver 310 are synchronized with each other in response to a synchronization signal Tsync.

The display drive part 302, 304, and 306 writes data to the pixels during the display driving period Td. The pixels hold the data voltage stored during the preceding display driving period Td because the TFTs are in the off state during the touch sensor driving period Tt. The display drive part 302, 304, and 306 may feed an alternating current signal having the same phase as the touch driving signal Tdry applied to the touch sensors Cs to the signal lines S1 to Sm and G1 to Gn, in order to minimize the parasitic capacitance between the touch sensors Cs and the signal lines connected to the pixels during the touch sensor driving period Tt. Here, the signal lines connected to the pixels are the data lines S1 to Sm and the gate lines G1 to Gn.

The display drive part 302, 304, and 306 comprises a data driver 302, a gate driver 304, and a timing controller 306.

During the display driving period Td, the data driver 302 converts digital video data RGB or RGBW of an input image received from the timing controller 306 to an analog positive/negative gamma compensation voltage to generate a data voltage, and outputs the data voltage output from the data driver 302 to the data lines S1 to Sm. During the touch sensor driving period Tt, the data driver 302 may apply an alternating current signal having the same phase as the touch driving signal Tdry applied to the touch sensors to the data lines S1 to Sm. This is because the voltages at both ends of the parasitic capacitance change simultaneously and the smaller the voltage difference, the less the amount of electric charge stored in the parasitic capacitance.

During the display driving period Td, the gate driver 304 sequentially supplies a gate pulse (or scan pulse) synchronized with the data voltage to the gate lines G1 to Gn and selects lines of the display panel 100 to which the data voltage is written. The gate pulse swings between a gate high voltage VGH and a gate low voltage VGL. The gate pulse is applied to the gates of the pixel TFTs through the gate lines G1 to Gn. The gate high voltage VGH is set to a voltage higher than a threshold voltage of the pixel TFTs and turns on the pixel TFTs. The gate low voltage VGL is a voltage lower than the threshold voltage of the pixel TFTs. The gate driver 304 applies an alternating current signal having the same phase as the touch driving signal Tdry applied to the touch sensors during the touch sensor driving period Tt to the gate lines G1 to Gn.

The timing controller 306 receives timing signals, such as a vertical synchronization signal Vsync, a horizontal synchronization signal Hsync, a data enable signal DE, and a main clock MCLK from a host system 308, and synchronizes the operation timings of the data driver 302, gate driver 304, and touch sensor driver 310. A scan timing control signal comprises a gate start pulse GSP, a gate shift clock, a gate output enable signal GOE, etc. A data timing control signal comprises a source sampling clock SSC, a polarity control signal POL, a source output enable signal SOE, etc.

The timing controller 306 transmits input image data RGB form the host system 308 to the data driver 302. The timing controller 306 may convert RGB data to RGBW data by a well-known white gain calculation algorithm and transmit it to the data driver 302.

The host system 308 may be implemented as any one of the following: a television system, a set-top box, a navigation system, a DVD player, a Blue-ray player, a personal computer PC, a home theater system, and a phone system. The host system 308 comprises a system-on-chip (SoC) having a scaler incorporated therein, and converts digital video data of an input image into a format suitable for the resolution of the display panel 300. The host system 308 transmits the digital video data RGB or RGBW of the input image and the timing signals to the timing controller 306. Further, the host system 308 executes an application associated with coordinate information XY of touch input from the touch sensor driver 310.

The timing controller 306 or the host system 308 may generate a synchronization signal Tsync for synchronizing the display driving part 302, 304, and 306 and the touch sensor driver 310.

The touch sensor driver 310 generates a touch driving signal Tdry during the touch sensor driving period Tt. The touch driving signal Tdry is supplied to the sensor electrodes 13 or C1 to C4 through the sensor lines M3. The touch sensor driver 310 may detect the location and area of a touch by measuring a change in the capacitance of the touch sensors Cs. The touch sensor driver 310 calculates coordinate information XY of the touch input and transmits it to the host system 308.

The data driver 302 and the touch sensor driver 310 may be integrated within a single IC (Integrated Circuit).

Figure 14:
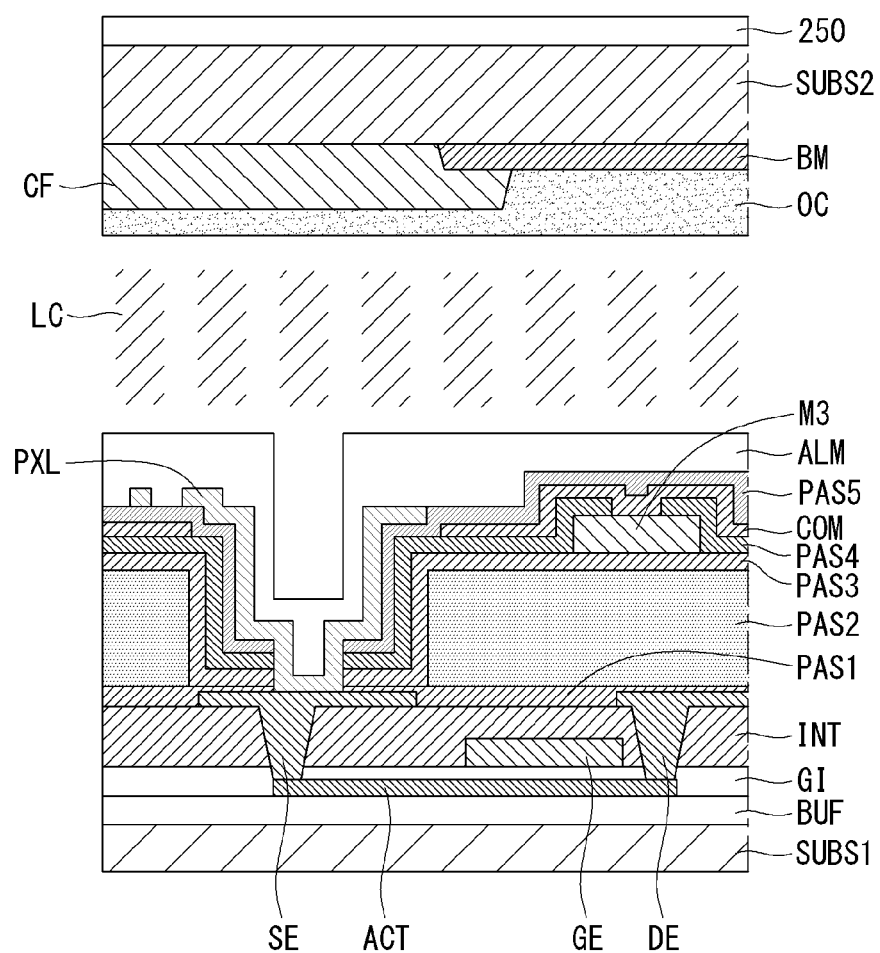
FIG. 14 is a cross-sectional view of a display panel according to an exemplary view of the present disclosure.

FIG. 14 is a cross-sectional view showing a cross-sectional structure of the display panel 300.

Referring to FIG. 14, a bottom plate of the display panel 300 comprises a TFT array on a lower substrate SUBS1. A top plate of the display panel 300 comprises a color filter array on an upper substrate SUBS2. A liquid crystal layer LC is formed between the top and bottom plates of the display panel 300.

A buffer insulating film BUF, a semiconductor pattern ACT, and a gate insulating film GI are formed on the lower substrate SUBS1. A first metal pattern is formed on the gate insulating film GI. The gate metal pattern comprises gates GE of TFTs and gate lines G1 to Gn connected to the gates GE. An interlayer insulating film INT covers a second metal pattern. A source-drain metal pattern is formed on the interlayer insulating film INT. The second metal pattern comprises data lines S1 to Sm and sources SE and drains DE of the TFTs. The drains DE area connected to the data lines S1 to Sm, and the sources SE and drains DE of the TFTs. The drains DE are connected to the data lines S1 to Sm. The sources SE and drains DE of the TFTs come into contact with the semiconductor pattern ACT of the TFTs via contact holes through the interlayer insulating film INT.

A first passivation film PAS1 covers the second metal pattern. A second passivation film PAS2 is formed on the first passivation film PAS1. Contact holes exposing the sources SE of the TFTs are formed in the second passivation film PAS. A third passivation film PAS3 is formed over the second passivation film PAS2, and a third metal pattern is formed on the third passivation film PAS3. The third metal pattern comprises sensor lines M3. A fourth passivation film PAS4 is formed over the third passivation film PAS3 to cover the third metal pattern. A fourth metal pattern is formed on the fourth passivation film PAS4. The fourth metal pattern comprises sensor electrodes 13 or COM made of a transparent electrode material such as ITO (indium tin oxide). A fifth passivation film PAS5 is formed over the fourth passivation film PAS4 to cover the fourth metal pattern. The first, third, fourth, and fifth passivation films PAS1, PAS3, PAS4, and PAS5 may be made of an inorganic insulating material such as SiOx or SiNx. The second passivation film PAS2 may be made of an organic insulating material such as photo-acryl.

The third, fourth, and fifth passivation films PAS1, PAS3, PAS4, and PAS5 comprise contact holes patterned to expose the sources SE of the TFTs. A fifth metal pattern is formed on the fifth passivation film PAS5. The fifth metal pattern comprises pixel electrodes 12 or PXL made of a transparent electrode such as ITO. An alignment film ALM is formed on the fifth passivation film PAS5 to cover the fifth metal pattern PAS5.

A black matrix BM and color filters CF are formed on the upper substrate SUBS2, and a planarization film OC is formed on them. The planarization film OC may be made of an organic insulating material. Although not shown, a spacer is formed between the upper substrate and the lower substrate, thereby maintaining a cell gap for the liquid crystal layer.

An antistatic film 250 according to the present invention is formed on the upper substrate SUBS2. The antistatic film 250 according to the present invention exhibits excellent electrical conductivity and excellent mechanical strength and transmittance, so it may be used as an antistatic coating film for touchscreen panels and display devices. The method of forming the antistatic film 250 is not specifically limited, but may be formed by applying and curing a conductive coating liquid composition according to the present invention. The method of application is not specifically limited, but may include well-known methods such as slit coating, knife coating, spin coating, casting, micro gravure coating, gravure coating, bar coating, roll coating, wire bar coating, dip coating, spray coating, screen printing, gravure printing, flexo printing, offset printing, inkjet printing, dispenser printing, nozzle coating, capillary coating, etc. After the application, the coating film is cured by drying at a given temperature, thereby forming the antistatic film 250.

Figure 15:
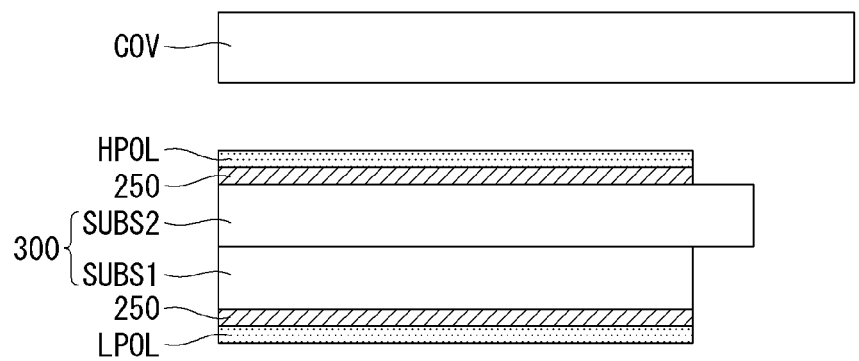
FIGS. 15 to 17 are schematic illustrations of various display devices to which an antistatic film of the present disclosure may be applied.
Figure 16:
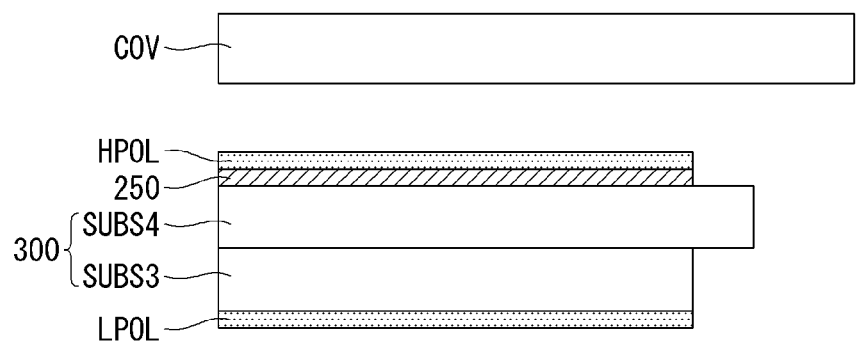
Figure 17:
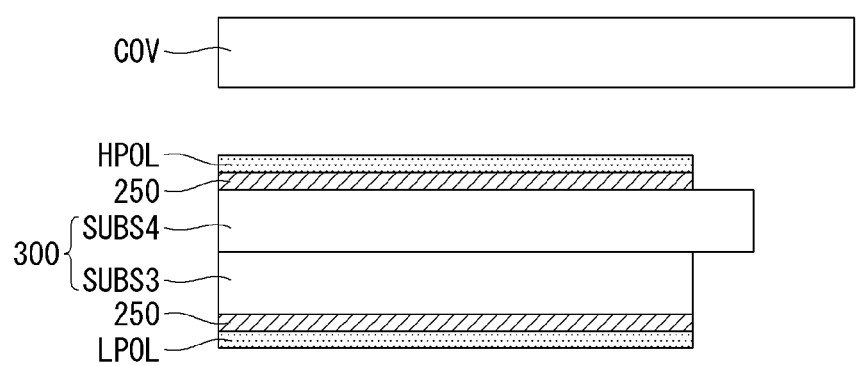

FIGS. 15 to 17 are views schematically showing various display devices to which an antistatic film of this invention applies.

Referring to FIG. 15, a display device according to an exemplary embodiment of the present invention comprises a display panel 300 which is formed by joining a lower substrate SUBS1 with a thin-film transistor array and an upper substrate SUBS2 with a color filter array together, and a cover window COV on the display panel 300. An antistatic film 250 according to the present invention may be attached to both surfaces of the display panel 300. That is, the antistatic film 250 may be disposed between the lower substrate SUBS1 and a lower polarizer LPOL, and the antistatic film 250 also may be disposed between the upper substrate SUBS2 and an upper polarizer HPOL. In this case, the antistatic film 250 is used for the purpose of reducing touch noise, and the lower the sheet resistance, the higher the noise-reducing effect. As for in-cell type touch devices, a sheet resistance of $10^6$ to $10^9$ Ω/sq is required, and as for add-on type touch devices, the lower the sheet resistance, the better.

Referring to FIGS. 16 and 17, a display device according to an exemplary embodiment of the present invention comprises a display panel 300 having a lower substrate SUBS3 with a color filter array and an upper substrate SUBS4 with a thin-film transistor array, and a cover window COV on the display panel 300. The display device shown in FIGS. 16 and 17 emit light upward, like the above-described display device of FIG. 15, but its color filer array and thin-film transistor are inverted unlike in FIG. 15. In this case, as shown in FIG. 16, the antistatic film 250 may be disposed between the upper substrate SUBS4 where the thin-film transistor is formed and the upper polarizer HPOL. On the other hand, as shown in FIG. 17, the antistatic film 250 may be disposed between the upper substrate SUBS4 where the thin-film transistor is formed and the upper polarizer HPOL and also between the lower substrate SUBS3 where the color filter array is formed and the lower polarizer LPOL. However, the present invention is not limited to this, and the antistatic film may be attached to any surface of various types of display devices.

Hereinafter, experimental examples will be provided to help understanding of the present invention. These examples are only exemplary and do not limit the attached claims. It will be apparent to those of ordinary skill in the art that various changes and modifications can be made thereto within the scope and technical spirit of the present disclosure and that such changes and modifications belong to the attached claims.

Second Experimental Example

Hereinafter, disclosed is an experimental example in which an antistatic film is formed using the above-described carbon nanotube dispersion liquid composition and a conductive coating liquid composition comprising the same.

Experiment 1: Measurement of Characteristics of Conductive Coating Liquid Composition and Coating Film (Antistatic Film) Manufactured Therefrom Example 1

<Preparation of Carbon Nanotube Dispersion Liquid>
Carbon nanotubes (SA100, Nano Solution Inc.) synthesized by an arc discharge method were thermally treated for 100 minutes under a rotation speed of 5-20 rpm, a temperature of 420° C., and an oxidative gas supply rate of 250 cc/min, using a rotary kiln reactor with an inclination angle of 3°, to obtain carbon nanotubes A having an impurity content of 15%, which were then used.

After that, a carbon nanotube dispersion liquid was prepared by mixing 0.15 parts by weight of carbon nanotubes A, 0.24 parts by weight of an aqueous solution of a polyacrylic acid resin (solid 25%/polyacrylic acid resin Mw= (250,000)), 0.23 parts by weight of an acrylic block copolymer (product name: DISPERBYK2001, acid value: 19 mgKOH/g, amine value: 29 mgKOH/g), and 99.61 parts by weight of n-propanol, and dispersing the mixture using a disperser with a nozzle diameter of 100 μm at a pressure of 1,500 bar.

<Preparation of Silane Sol>
21.7 parts by weight of normal propanol and 62.6 parts by weight of TEOS were fed into a reactor with a flux tube, and stirred at 300 rpm under room temperature (25° C.) using a stirrer for 30 minutes. Then, 15.2 parts by weight of water was added thereto, followed by stirring at 500 rpm, and then 0.5 parts by weight of a 3.5% aqueous solution of hydrochloric acid was slowly dropped.

<Conductive Coating Liquid Composition>
A coating liquid was prepared by conducting a procedure, five times, in which 33 parts by weight of a binder, 0.95 parts by weight of BYK2001, and 0.05 parts by weight of BYK333 as a surface slip agent were added to 66 parts by weight of the prepared carbon nanotube dispersion liquid and then the mixture was allowed to pass through a 100 μm nozzle under a pressure of 1,500 bar using a high-pressure disperser. Here, a cooling apparatus was used to reduce or prevent the rise of the liquid temperature.

Example 2 (when the Type of Dispersion Medium is Different)

A conductive coating liquid composition was produced by the same method as in Example 1 except that ethanol was used as a dispersion medium at the time of preparing a carbon nanotube dispersion liquid.

Example 3 (when the Type of Dispersion Medium is Different)

A conductive coating liquid composition was produced by the same method as in Example 1 except that butanol was used as a dispersion medium at the time of preparing a carbon nanotube dispersion liquid.

Example 4 (when the Type of Dispersion Medium is Different)

A conductive coating liquid composition was produced by the same method as in Example 1 except that pentanol was used as a dispersion medium at the time of preparing a carbon nanotube dispersion liquid.

Example 5 (when the Weight Average Molecular Weight of PAA is Different

A conductive coating liquid composition was produced by the same method as in Example 1 except that a polyacrylic acid resin having a weight average molecular weight of 1,250,000 was used at the time of preparing a carbon nanotube dispersion liquid.

Example 6 (when BYK 2155 is Used)

A conductive coating liquid composition was produced by the same method as in Example 1 except that DISPERBYK 2155 was used instead of DISPERBYK 2001 at the time of preparing a carbon nanotube dispersion liquid.

Example 7 (when the Jetting Pressure is Different)

A conductive coating liquid composition was produced by the same method as in Example 1 except that jetting was conducted at a pressure of 1,000 bar at the time of preparing a carbon nanotube dispersion liquid.

Example 8 (when the Jetting Pressure is Different)

A conductive coating liquid composition was produced by the same method as in Example 1 except that jetting was conducted at a pressure of 1,800 bar at the time of preparing a carbon nanotube dispersion liquid.

Example 9 (when the Diameter of the Jet Nozzle is Different)

A conductive coating liquid composition was produced by the same method as in Example 1 except that jetting was conducted using a nozzle with a diameter of 500 μm at the time of preparing a carbon nanotube dispersion liquid.

Example 10 (when the Diameter of the Jet Nozzle is Different)

A conductive coating liquid composition was produced by the same method as in Example 1 except that jetting was conducted using a nozzle with a diameter of 300 μm at the time of preparing a carbon nanotube dispersion liquid.

Example 11

A coating liquid was prepared by conducting a procedure, five times, in which 14 parts by weight of a binder, 0.95 parts by weight of BYK2001, 5 parts by weight of ethylene glycol, and 0.05 parts by weight of BYK333 as a surface slip agent were added to 80 parts by weight of the prepared carbon nanotube dispersion liquid and then the mixture was allowed to pass through a 100 μm nozzle under a pressure of 1,500 bar using a high-pressure disperser. Here, a cooling apparatus was used to reduce or prevent the rise of the liquid temperature.

Comparative Example 1 (when the Type of Dispersion Medium Departs from the Scope of the Present Invention)

A conductive coating liquid composition was produced by the same method as in Example 1 except that isopropanol was used as a dispersion medium at the time of preparing a carbon nanotube dispersion liquid.

Comparative Example 2 (when Sodium Dodecyl Sulfonate was Used as Dispersion Medium, Instead of PAA)

A conductive coating liquid composition was produced by the same method as in Example 1 except that an aqueous solution of sodium dodecyl sulfonate was used instead of the aqueous solution of polyacrylic acid at the time of preparing a carbon nanotube dispersion liquid.

Comparative Example 3 (when Isopropanol is Used and the Jet Pressure Departs from the Scope of the Present Invention)

A conductive coating liquid composition was produced by the same method as in Example 1 except that jetting was conducted at a pressure of 900 bar at the time of preparing a carbon nanotube dispersion liquid.

Comparative Example 4 (when Isopropanol is Used and the Jet Pressure Departs from the Scope of the Present Invention)

A conductive coating liquid composition was produced by the same method as in Example 1 except that jetting was conducted at a pressure of 2,000 bar at the time of preparing a carbon nanotube dispersion liquid.

Test Method (1) Evaluation of Dispersibility

In order to evaluate the carbon nanotube dispersion liquid compositions produced according to the examples and comparative examples, the Zeta potential was measured, and evaluation was conducted on the basis of the following evaluation standard.

<Evaluation Standard>
○: Absolute value of more than 25 mV
Δ: Absolute value in the range of 10 to 25 mV
x: Absolute value of less than 10 mV (2) Evaluation on Dispersion Stability It was evaluated whether or not the carbon nanotube dispersion liquid compositions produced according to the examples and comparative examples aggregate in vials at room temperature for 30 days, on the basis of the following evaluation standard.

<Evaluation Standard>
○: Aggregated after 14 days
Δ: Aggregated after 7 days
x: Aggregated within 2 days (3) Evaluation of Coatability Conductive coating films were formed by coating the conductive coating liquid compositions according to the examples and comparative examples on glass substrates using a spin coater at 400 rpm for 15 seconds, conducting drying using a hot plate at 140° C. for 10 minutes, and conducting further drying using a hot-air dryer for 30 minutes. The uniformity of the formed coating films was observed by naked eyes, and evaluation was conducted on the basis of the following evaluation standard.

<Evaluation Standard>
○: No pinholes
Δ: Less than 2 pinholes
x: 2 or more pinholes (4) Evaluation on Surface Resistivity Conductive coating films were formed by coating the conductive coating liquid compositions according to the examples and comparative examples on glass substrates using a spin coater at 400 rpm for 15 seconds, conducting drying using a hot plate at 140° C. for 10 minutes, and conducting further drying using a hot-air dryer for 30 minutes. The surface resistivity of the formed coating films was measured using a surface resistivity meter. Here, the measurement of the surface resistivity was conducted by a 4-point probe method. The coating film was divided into three equal parts lengthwise, and the measurement was conducted at the middle portion thereof.

(5) Transmittance

Conductive coating films were formed by coating the conductive coating liquid compositions according to the examples and comparative examples on glass substrates using a spin coater at 400 rpm for 15 seconds, conducting drying using a hot plate at 140° C. for 10 minutes, and conducting further drying using a hot-air dryer for 30 minutes. The transmittance of the formed coating films was measured at 550 nm using a spectrophotometer, and evaluation was conducted compared with 90.5%, which is the transmittance of a glass substrate on which a coating film was not formed, on the basis of the following evaluation standard.

<Evaluation Standard>
○: 89.5≤transmittance (%)
Δ: 87.5≤transmittance (%)<89.5
x: transmittance (%)<87.5

(6) Scratch Resistance

Conductive coating films were formed by coating the conductive coating liquid compositions according to the examples and comparative examples on glass substrates using a spin coater at 400 rpm for 15 seconds, conducting drying using a hot plate at 140° C. for 10 minutes, and conducting further drying using a hot-air dryer for 30 minutes. The surface hardness of the formed coating films was measured using a pencil hardness tester (221-D, Yoshimitsu).

<Evaluation Standard>
○: 8~9 H
Δ: 6~7 H
x: ~5 H

The dispersion characteristics, coatability, surface resistivity, transmittance, and scratch resistance of the coating films formed according to the examples and comparative examples were measured, and tabulated in Table 3 below. In Table 3 below, ○ is excellent, Δ is good, and x is bad.

TABLE 3

| | Dispersion Characteristics | | | Surface | | |
|---|---|---|---|---|---|---|
| | Dispersibility | Dispersion Stability | Coatability | Resistivity ($\Omega$/sq) | Transmittance (%) | Scratch Resistance |
| Example 1 | ○ | ○ | ○ | $10^{8.0}$ | ○ | ○ |
| Example 2 | ○ | ○ | ○ | $10^{8.0}$ | ○ | ○ |
| Example 3 | ○ | ○ | ○ | $10^{8.2}$ | ○ | ○ |
| Example 4 | ○ | Δ | ○ | $10^{8.7}$ | ○ | ○ |
| Example 5 | ○ | ○ | ○ | $10^{8.2}$ | ○ | ○ |
| Example 6 | ○ | ○ | ○ | $10^{8.1}$ | ○ | ○ |
| Example 7 | ○ | ○ | ○ | $10^{8.1}$ | ○ | ○ |
| Example 8 | ○ | ○ | ○ | $10^{8.3}$ | ○ | ○ |
| Example 9 | ○ | Δ | ○ | $10^{8.1}$ | ○ | ○ |
| Example 10 | ○ | Δ | ○ | $10^{8.3}$ | ○ | ○ |
| Example 11 | ○ | ○ | ○ | $10^{5.0}$ | ○ | ○ |
| Comparative Example 1 | Δ | X | Δ | $10^{8.2}$ | ○ | ○ |
| Comparative Example 2 | X | X | X | $10^{9.4}$ | X | Δ |
| Comparative Example 3 | Δ | X | Δ | $10^{8.3}$ | ○ | Δ |
| Comparative Example 4 | Δ | X | Δ | $10^{8.5}$ | ○ | ○ |

Referring to Table 3 as for Examples 1 to 3 in which propanol, ethanol, and butanol were used as a solvent at the time of preparing the carbon nanotube dispersion liquid, the dispersibility, dispersion stability, coatability, transmittance, and scratch resistance were excellent, and the surface resistivity values thereof were $10^{8.0}$, $10^{8.0}$, and $10^{8.2}$ ($\Omega$/sq), respectively. As for Example 4, the dispersibility, coatability, transmittance, and scratch resistance were excellent, the dispersion stability was good, and the surface resistivity value was $10^{8.7}$ ($\Omega$/sq).

As for Example 5 in which a polyacrylic acid resin having a weight average molecular weight of 1,250,000 was used and Example 6 in which DISPERBYK 2155 was used, at the time of preparing the carbon nanotube dispersion liquid, the dispersibility, dispersion stability, coatability, transmittance, and scratch resistance were excellent, and the surface resistivity values thereof were $10^{8.2}$ and $10^{8.1}$ ($\Omega$/sq).

As for Example 7 in which jetting was conducted at a pressure of 1,000 bar at the time of preparing the carbon nanotube dispersion liquid, the dispersibility, dispersion stability, coatability, transmittance, and scratch resistance were excellent, and the surface resistivity value was $10^{8.1}$ ($\Omega$/sq). In addition, as for Example 8 in which jetting was conducted at a pressure of 1,800 bar, the dispersibility, coatability, transmittance, and scratch resistance were excellent while the dispersion stability was good, and the surface resistivity value was $10^{8.3}$ ($\Omega$/sq).

As for Examples 9 and 10 in which jetting was conducted using nozzles with diameters of 500 μm and 300 μm at the time of preparing the carbon nanotube dispersion liquid, the surface resistivity values were $10^{8.1}$ and $10^{8.3}$ ($\Omega$/sq), respectively, and the dispersibility, coatability, transmittance, and scratch resistance were excellent while the dispersion stability was good.

As for Example 11 in which 14 parts by weight of a binder, 0.95 parts by weight of BYK2001, and 5 parts by weight of ethylene glycol were added to 80 parts by weight of the carbon nanotube dispersion liquid, the surface resistivity value was $10^{5.0}$ ($\Omega$/sq), and the dispersibility, dispersion stability, coatability, transmittance, and scratch resistance were excellent.

On the other hand, as for Comparative Example 1 in which isopropanol was used as a dispersion medium at the time of the carbon nanotube dispersion liquid, the surface resistivity value was $10^{8.2}$ ($\Omega$/sq), and the transmittance and scratch resistance were excellent, but the dispersibility and coatability were good, and the dispersion stability was bad.

As for Comparative Example 2 in which the aqueous solution of sodium dodecyl sulfonate was used instead of the aqueous solution of polyacrylic acid at the time of preparing the carbon nanotube dispersion liquid, the surface resistivity value was $10^{9.4}$ ($\Omega$/sq), and the scratch resistance was good, but the dispersibility, dispersion stability, coatability, and transmittance were bad.

As for Comparative Examples 3 and 4 in which isopropanol was used and jetting was conducted at 900 bar and 2,000 bar, respectively, at the time of preparing the carbon nanotube dispersion liquid, the surface resistivity values were, respectively, $10^{8.3}$ and $10^{8.5}$ ($\Omega$/sq), the transmittance was excellent, and the dispersibility and coatability were good, but the dispersion stability was bad. In addition, the scratch resistance was good for Comparative Example 3, and excellent for Comparative Example 4.

These results indicate that the coating films manufactured in accordance with the process of preparing the carbon nanotube dispersion liquid according to the present invention had excellent dispersibility, dispersion stability, coatability, surface resistivity, transmittance, and scratch resistance.

Experiment 2: Measurement of Characteristics of Conductive Coating Liquid Composition and Antistatic Film Manufactured Therefrom Example 12

A conductive coating liquid composition was produced by conducting a procedure, five times, in which n-methyl pyrolidone (NMP) as a polar solvent was added to a conductive coating liquid composition comprising 83.3 wt % of a carbon nanotube dispersion liquid, 167.65 wt % of a TEOS sol binder, and 0.05 wt % of an additive then the mixture was allowed to pass through a 100 μm nozzle under a pressure of 1,500 bar using a high-pressure disperser.

Example 13

A conductive coating liquid composition was produced under the same condition as Example 12, except that dimethyl formamide (DMF) was added as the polar solvent.

Comparative Example 5

A conductive coating liquid composition was produced under the same condition as Example 12, except that no polar solvent was added.

In the above-described Examples 12 and 13, the conductive coating liquid compositions were produced by varying the content of the polar solvent to 1, 2, 3, 4, and 5 wt %, and then spin-coated on a substrate and cured for 10 minutes at 140° C. Afterwards, the surface resistance of the coating films was measured and tabulated in Table 4 below. In Table 4 below, the surface resistance is denoted by the exponent X of $10^X$ Ω/sq.

TABLE 4

|  |  | Polar Solvent (wt %) | | Surface Resistance |
|---|---|---|---|---|
|  |  | NMP | DMF | ($10^X$ Ω/sq) |
| Comparative Example 5 |  | 0 | 0 | 8.8 |
| Example 12 | #1 | 1 | 0 | 7 |
|  | #2 | 2 | 0 | 6.4 |
|  | #3 | 3 | 0 | 5.5 |
|  | #4 | 4 | 0 | 4.9 |
|  | #5 | 5 | 0 | 4.5 |
| Example 13 | #1 | 0 | 1 | 8.2 |
|  | #2 | 0 | 2 | 7.5 |
|  | #3 | 0 | 3 | 6.3 |
|  | #4 | 0 | 4 | 5.6 |
|  | #5 | 0 | 5 | 5.1 |

Referring to Table 4, the antistatic film made of the conductive coating liquid composition comprising no polar solvent had a surface resistance of $10^{8.8}$ Ω/sq. On the other hand, the surface resistance of the antistatic film made of the conductive coating liquid composition of Example 12 comprising n-methyl pyrolidone as the polar solvent decreased from $10^7$ Ω/sq to $10^{4.5}$ Ω/sq as the content of the polar solvent increased from 1 to 5. Also, the surface resistance of the antistatic film made of the conductive coating liquid composition of Example 13 comprising dimethyl formamide as the polar solvent decreased from $10^{8.2}$ Ω/sq to $10^{8.1}$ Ω/sq as the content of the polar solvent increased from 1 to 5.

These results indicate that an antistatic film made of a conductive coating liquid composition comprising a polar solvent may have a lower surface resistance than an antistatic film made of a conductive coating liquid composition comprising no polar solvent. Also, these results indicate that the surface resistance of an antistatic film may be increased or decreased to a desired level by adjusting the content of the polar solvent.

Accordingly, a conductive coating liquid composition according to the present invention can decrease and adjust the surface resistance of an antistatic film by comprising a polar solvent having a polarity of 10 or higher.

As seen above, a conductive coating liquid composition according to the present invention can improve the surface resistance uniformity of an antistatic film and adjust its surface resistance by improving the dispersibility of carbon nanotubes by means of a polar solvent.

An antistatic film made of the conductive coating liquid composition according to the present invention exhibits excellent electrical conductivity and excellent mechanical strength and transmittance, so it can be used as an antistatic coating film for touchscreen panels and display devices. An antistatic film and a display device comprising the same can avoid failures caused by static electricity, prevent degradation in touch sensitivity, improve sheet resistance uniformity, thermal resistance, and reliability, and reduce manufacturing costs by easily discharging static electricity generated during the manufacturing process.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A conductive coating liquid composition comprising a carbon nanotube dispersion liquid comprising 0.05 to 20 wt % of carbon nanotubes, 0.02 to 40 wt % of a polyacrylic acid resin, 50 to 99.93 wt % of a straight-chain alkanol having 2 to 5 carbon atoms, and 0.1 to 2 wt % of at least one additional dispersant, which is an acrylic block copolymer dispersant, based on 100 wt % of the carbon nanotube dispersion liquid; 10 to 100 parts by weight of a silane sol based on 100 parts by weight of the carbon nanotube dispersion liquid; and 0.1 to 5 wt % of a polar solvent based on 100 wt % of the conductive coating liquid composition.

2. The conductive coating liquid composition of claim 1, wherein the polar solvent has a polarity of 10 or higher.

3. The conductive coating liquid composition of claim 2, wherein the polar solvent comprises at least one selected from n-methyl pyrolidone (NMP), dimethyl sulphoxide (DMSO), and dimethyl formamide (DMF).

4. The conductive coating liquid composition of claim 1, wherein the silane sol comprises an alkoxysilane compound, an acid catalyst, an alcohol-based solvent, and water.

5. The conductive coating liquid composition of claim 4, wherein the silane sol comprises 20 to 60 wt % of the alkoxysilane compound, 10 to 70 wt % of the alcohol-based solvent, and 5 to 60 wt % of water based on the total weight of the silane sol.

6. A display device comprising an antistatic film comprising the conductive coating liquid composition according to claim 1.

* * * * *